(12) United States Patent
Kim et al.

(10) Patent No.: US 12,501,813 B2
(45) Date of Patent: Dec. 16, 2025

(54) DISPLAY APPARATUS AND ELECTRONIC DEVICE HAVING THE SAME

(71) Applicant: Samsung Display Co., Ltd., Yongin-si (KR)

(72) Inventors: Kiyoung Kim, Yongin-si (KR); Jongseok Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 618 days.

(21) Appl. No.: 17/847,133

(22) Filed: Jun. 22, 2022

(65) Prior Publication Data

US 2023/0065135 A1 Mar. 2, 2023

(30) Foreign Application Priority Data

Aug. 24, 2021 (KR) .......................... 10-2021-0111869

(51) Int. Cl.
*H10K 59/65* (2023.01)
*H10K 50/844* (2023.01)
*H10K 50/86* (2023.01)
*H10K 59/122* (2023.01)
*H10K 102/00* (2023.01)

(52) U.S. Cl.
CPC ........... *H10K 59/65* (2023.02); *H10K 50/844* (2023.02); *H10K 50/865* (2023.02); *H10K 59/122* (2023.02); *H10K 2102/311* (2023.02)

(58) Field of Classification Search
CPC .... H10K 59/65; H10K 59/122; H10K 50/865; H10K 50/844; H10K 2102/311
See application file for complete search history.

(56) References Cited

U.S. PATENT DOCUMENTS

| | | | |
|---|---|---|---|
| 10,504,979 B2 * | 12/2019 | Kim | ...................... H10H 20/84 |
| 11,227,907 B2 | 1/2022 | Bae et al. | |
| 11,683,962 B2 | 6/2023 | Cho et al. | |
| 2020/0328269 A1 | 10/2020 | Shin et al. | |
| 2020/0365674 A1 | 11/2020 | Jeon et al. | |
| 2020/0373372 A1 | 11/2020 | Chung et al. | |

FOREIGN PATENT DOCUMENTS

| | | |
|---|---|---|
| KR | 10-2018-0032249 | 3/2018 |
| KR | 1020200090299 A | 7/2020 |
| KR | 10-2020-0119452 | 10/2020 |
| KR | 10-2020-0131397 | 11/2020 |
| KR | 10-2020-0135637 | 12/2020 |
| KR | 1020210080671 A | 7/2021 |

* cited by examiner

*Primary Examiner* — Richard A Booth
(74) *Attorney, Agent, or Firm* — Innovation Counsel LLP

(57) ABSTRACT

An electronic device includes a housing including a rear surface and side surfaces, a cover window disposed on an upper portion of the housing, a display apparatus disposed on a lower portion of the cover window, and a camera disposed on a lower portion of the display apparatus, wherein the display apparatus includes a substrate including a first area overlapping the camera, which includes a display area, a wire area, and a transmission area, and a second area adjacent to the first area, a first organic insulating layer including a valley portion disposed in the display area that is adjacent to the transmission area, and a pixel-defining layer disposed on the first organic insulating layer and including at least a portion filled in the valley portion.

20 Claims, 14 Drawing Sheets

DISPLAY APPARATUS AND ELECTRONIC DEVICE HAVING THE SAME

CROSS REFERENCE TO RELATED APPLICATION

This application claims priority from and the benefit of Korean Patent Application No. 10-2021-0111869, filed on Aug. 24, 2021, which is hereby incorporated by reference for all purposes as if fully set forth herein.

BACKGROUND

Field

Embodiments of the invention relate generally to a display apparatus and an electronic device including the display apparatus and, more specifically, to a display apparatus including an area having improved transmittance and an electronic device including the display apparatus.

Discussion of the Background

Recently, display apparatuses have been used in various fields. Also, due to the decrease in thickness and weight of the display apparatuses, the usage of the display apparatuses has widened or broaden.

As active areas in display apparatuses increase, various functions, which are added to or associated with the display apparatuses, have been implemented. To add the various functions to the increased active areas, research has been conducted to develop display apparatuses having areas for adding the various functions, other than an image display function, inside the active areas.

The above information disclosed in this Background section is only for understanding of the background of the inventive concepts, and, therefore, it may contain information that does not constitute prior art.

SUMMARY

Display devices and electronic devices having the display devices constructed according to the principles of the invention are capable of improving transmittance of active areas of the display devices such that the electronic devices perform high quality functions. For example, the electronic devices include a sensor unit (e.g., a camera unit) arranged under the display devices. The sensor unit (e.g., the camera unit) are arranged in the active areas having the improved transmittance such that the performance of the sensor unit is improved.

Additional features of the inventive concepts will be set forth in the description which follows, and in part will be apparent from the description, or may be learned by practice of the inventive concepts.

According to an aspect of the invention, an electronic device includes a housing including a rear surface and side surfaces, a cover window disposed on an upper portion of the housing, a display apparatus disposed on a lower portion of the cover window, and a camera disposed on a lower portion of the display apparatus, wherein the display apparatus includes a substrate including a first area overlapping the camera, which includes a display area, a wire area, and a transmission area, and a second area that is adjacent to the first area, a first organic insulating layer including a valley portion disposed in the display area that is adjacent to the transmission area, and a pixel-defining layer disposed on the first organic insulating layer and including at least a portion filled in the valley portion.

The electronic device may further include a second organic insulating layer disposed between the first organic insulating layer and the pixel-defining layer and including a first hole defined in the second organic insulating layer and corresponding to the transmission area, and a third organic insulating layer disposed between the second organic insulating layer and the pixel-defining layer and including a second hole defined in the third organic insulating layer and corresponding to the transmission area.

The pixel-defining layer may cover a side surface of the second organic insulating layer, which is adjacent to the transmission area, and a side surface of the third organic insulating layer, which is adjacent to the transmission area.

The first organic insulating layer may be disposed in the first area.

The electronic device may further include a light blocking layer disposed in the display apparatus and disposed between the substrate and the first organic insulating layer, and a protective pattern disposed on the first organic insulating layer in the display area.

The valley portion may be disposed between the protective pattern and an edge portion of the light blocking layer in a plan view.

The valley portion may be disposed along an edge of the transmission area.

The electronic device may further include an inorganic insulating layer disposed between the substrate and the first organic insulating layer, wherein the valley portion may expose at least a portion of an upper surface of the insulating layer.

The valley portion may include a first valley portion and a second valley portion, and the pixel-defining layer may be filled in at least one of the first valley portion and the second valley portion.

The pixel-defining layer may be disposed in the first area to have an island pattern in a plan view.

According to another aspect of the invention, a display apparatus includes a substrate including a first area and a second area adjacent to the first area, wherein the first area includes a display area, a wire area, and a transmission area, a first organic insulating layer including a valley portion disposed in the display area that is adjacent to the transmission area, and a pixel-defining layer disposed on the first organic insulating layer and including at least a portion filled in the valley portion.

The display apparatus may further include a second organic insulating layer disposed between the first organic insulating layer and the pixel-defining layer and including a first hole defined in the second organic insulating layer and corresponding to the transmission area, and a third organic insulating layer disposed between the second organic insulating layer and the pixel-defining layer and including a second hole defined in the third organic insulating layer and corresponding to the transmission area.

The pixel-defining layer may cover a side surface of the second organic insulating layer, which is adjacent to the transmission area, and a side surface of the third organic insulating layer, which is adjacent to the transmission area.

The first organic insulating layer may be disposed in the first area.

The display apparatus may further include a light blocking layer disposed in the display apparatus and disposed between the substrate and the first organic insulating layer, and a protective pattern disposed on the first organic insulating layer in the display area.

The valley portion may be disposed between the protective pattern and an edge portion of the light blocking layer in a plan view.

The valley portion may be disposed along an edge of the transmission area.

The display apparatus may further include an inorganic insulating layer disposed between the substrate and the first organic insulating layer, wherein the valley portion may expose at least a portion of an upper surface of the inorganic insulating layer.

The valley portion may include a first valley portion and a second valley portion, and the pixel-defining layer may be disposed in at least one of the first valley portion and the second valley portion.

The pixel-defining layer may be disposed in the first area to have an island pattern in a plan view.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate illustrative embodiments of the invention, and together with the description serve to explain the inventive concepts.

DETAILED DESCRIPTION

Figure 1:
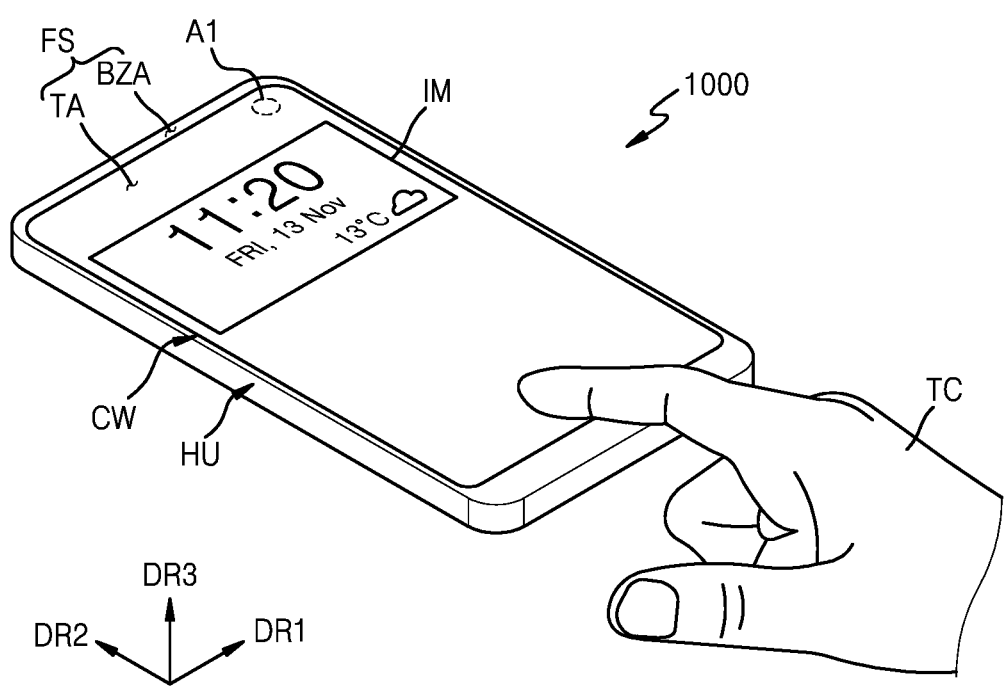
FIG. 1 is a schematic perspective view of an embodiment of an electronic device constructed according to the principles of the invention.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing illustrative features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the DR1-axis, the DR2-axis, and the DR3-axis are not limited to three axes of a rectangular coordinate system, such as the x, y, and z-axes, and may be interpreted in a broader sense. For example, the DR1-axis, the DR2-axis, and the DR3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of idealized embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the inventive concepts. Further, the blocks, units, and/or modules of some embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

In embodiments below, when a wire is referred to as "extending in a first direction or a second direction," the wire may extend not only in a straight line, but in a zigzag shape or in a curved line in the first or second direction.

In embodiments below, the expression "on a plane" and "in a plan view" may indicate that an object is viewed from the top, and the expression "on a cross-sectional view" may indicate that an object is viewed from the side when the object is vertically cut. In embodiments below, when components "overlap" each other, the components may overlap "on a plane", "in a plan view", and "on a cross-sectional view."

Hereinafter, one or more embodiments of the present disclosure will be described in detail with reference to the attached drawings, and like reference numerals in the drawing denote like elements.

Figure 2A:
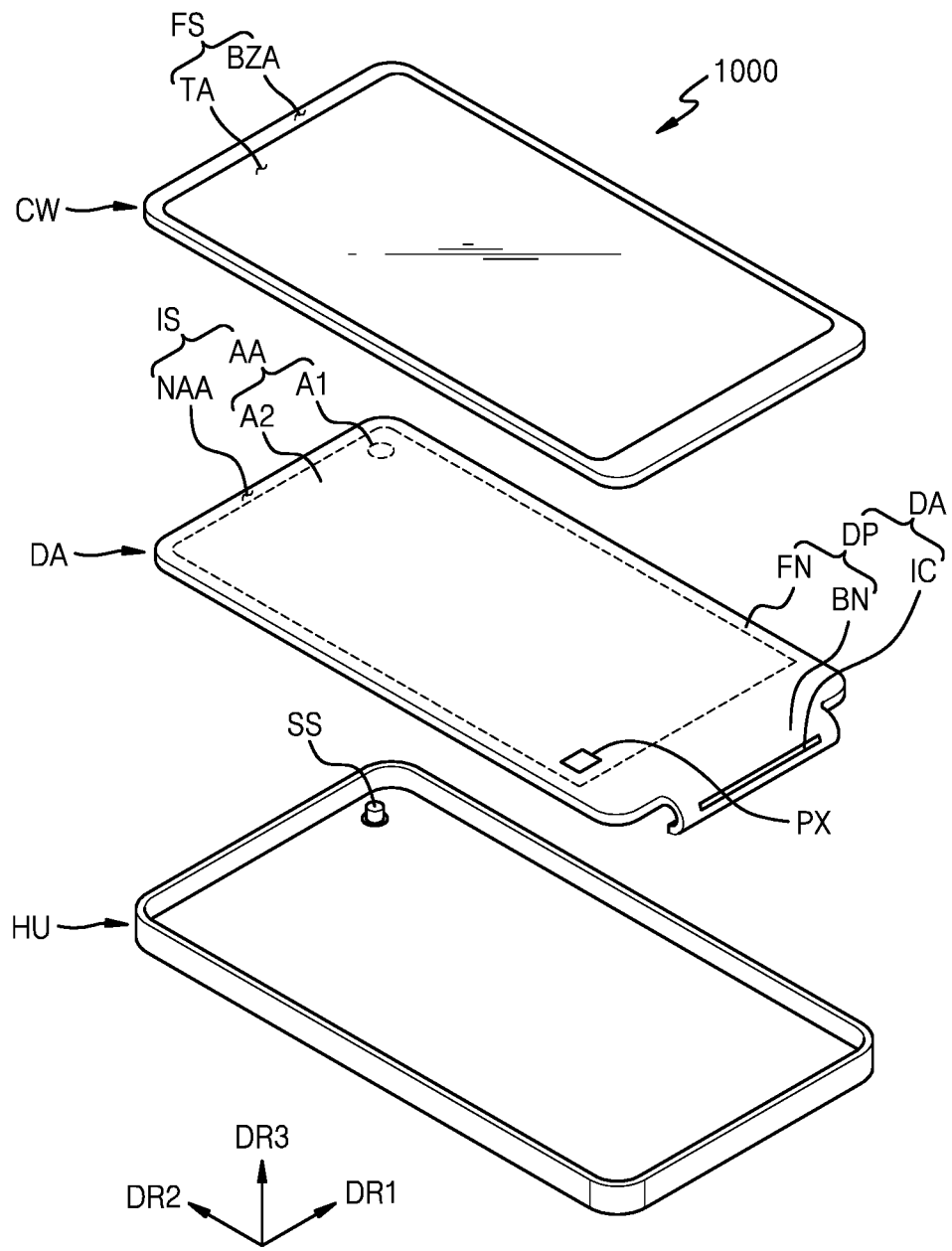
FIG. 2A is an exploded perspective view of the electronic device of FIG. 1.
Figure 2B:
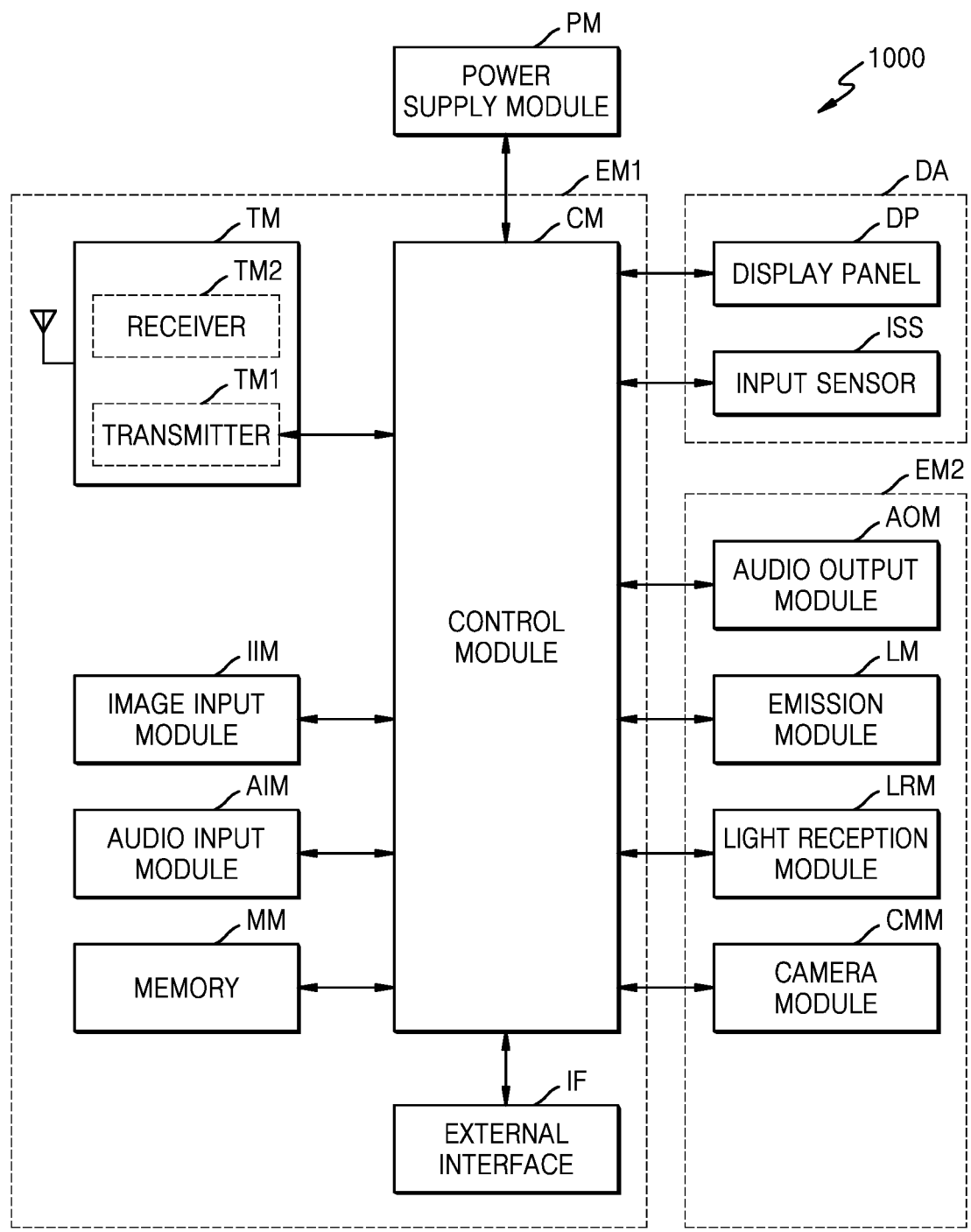
FIG. 2B is a block diagram of the electronic device of FIG. 1.

FIG. 1 is a schematic perspective view of an electronic device according to an embodiment, FIG. 2A is an exploded perspective view of the electronic device according to an embodiment, and FIG. 2B is a block diagram of the electronic device according to an embodiment.

An electronic device 1000 according to an embodiment is a device for displaying a moving image or a still image and may be used as a display screen of various products, for example, a portable electronic device such as a mobile phone, a smartphone, a tablet Personal Computer (PC), a mobile communication terminal, a personal digital assistant, an e-book terminal, a Portable Multimedia Player (PMP), a navigation device, or an Ultra Mobile PC (UMPC), a television (TV), a laptop, a monitor, a billboard, an Internet of Things (IoT) device, and the like. Also, the electronic device 1000 according to an embodiment may be used in a wearable device such as a smartwatch, a watch phone, an eyewear display, or a head mounted display (HMD). Also, the electronic device 1000 may be used as a display in an instrument cluster of a vehicle, a Center Information Display (CID) mounted on a center fascia or a dashboard of a vehicle, a room mirror display for replacing a side-view mirror of a vehicle, or a car headrest monitor provided for rear-seat entertainment. For descriptive convenience, FIG. 1 illustrates that the electronic device 1000 is used as a smart phone.

Referring to FIGS. 1, 2A, and 2B, the electronic device 1000 may display an image IM on a display surface IS which is respectively parallel to a first direction DR1 and a second direction DR2, towards a third direction DR3. A display surface FS, on which the image IM is displayed, may correspond to a front surface of the electronic device 1000 and/or a front surface FS of a cover window CW.

Hereinafter, a display surface of the electronic device 1000, a front surface of the electronic device 1000, and a front surface of the cover window CW are indicated by the same reference symbol. The image IM may include not only a moving image but also a still image. FIG. 1 illustrates a clock as an example of the image IM. For example, the electronic device 1000 may include a display apparatus DA (e.g., in FIG. 2A).

In an embodiment, front surfaces (e.g., upper surfaces) and rear surfaces (e.g., lower surfaces) of respective components are defined with respect to a direction in which the image IM is displayed. The front and rear surfaces of the respective components may be opposite to each other in the third direction DR3, and a normal direction of each of the front and rear surfaces of the respective components may be parallel to the third direction DR3. A distance between the front and rear surfaces of the respective components in the third direction DR3 may correspond to a thickness of the display apparatus DA in the third direction DR3.

The electronic device 1000 according to an embodiment may detect a user input TC from the outside. The user input TC may include various types of external inputs such as a portion of a body part of a user, light, heat, pressure, and the like. In an embodiment, the user input TC is illustrated as a hand of the user that contacts the front surface of the electronic device 1000. However, embodiments are not limited thereto. For example, the user input TC may be provided in various forms, and the electronic device 1000 may also detect a user input TC that is transmitted to a side surface or a rear surface of the electronic device 1000 according to a structure of the electronic device 1000. For example, the rear surface of the electronic device 1000 may be opposite to the front surface of the electronic device 1000, e.g., in the third direction DR3.

In an embodiment, a first area A1 of the display apparatus DA may be defined within a transmission area TA thereof. The first area A1 of the display apparatus DA may be an area at least a portion of which overlaps an electronic module SS. FIG. 1 illustrates that the first area A1 of the display apparatus DA has a circular shape on a right upper side of the electronic device 1000, but one or more embodiments are not limited thereto. According to the number and the shape of the electronic module SS, the first area A1 of the display apparatus DA may vary in number and shape.

The electronic device 1000 may receive an external signal necessary for the electronic module SS through the first area A1 of the display apparatus DA or may provide a signal output from the electronic module SS to the outside. In an embodiment, as the first area A1 of the display apparatus DA overlaps the transmission area TA, an area of a bezel area BZA of the cover window CW for forming the transmission area TA may decrease.

The electronic device 1000 may include the cover window CW, a housing HU, the display apparatus DA, and the electronic module SS. In an embodiment, the cover window CW and the housing HU may be coupled to each other and thus form an exterior of the electronic device 1000.

The cover window CW may include an insulation panel. For example, the cover window CW may include glass, plastic, or a combination thereof.

The front surface FS of the cover window CW may define the front surface of the electronic device 1000. The transmission area TA of the cover window CW may be optically transparent. For example, the transmission area TA may have infrared transmittance of at least about 90%.

The bezel area BZA of the cover window CW may define a shape of the transmission area TA thereof. The bezel area BZA may be adjacent to the transmission area TA and surround the transmission area TA. The bezel area BZA may have relatively lower transmittance than the transmission area TA. The bezel area BZA may include an opaque material that blocks light. The bezel area BZA may have a certain color. The bezel area BZA may be defined by a bezel layer provided separately from a transparent substrate that defines the transmission area TA, or may be defined by an ink layer inserted or stained to the transparent substrate.

The display apparatus DA may include a display panel DP, on which the image IM is displayed, an input sensor ISS (see FIG. 2B) that detects an external input TC, and a driving circuit IC. The display apparatus DA may include the front surface including an active area AA and a peripheral area NAA. The active area AA may be activated in response to an electrical signal.

In an embodiment, the active area AA of the display apparatus DA may be an area where the image IM is displayed as well as an area where the external input TC is detected. The active area AA may be an area where a plurality of pixels PX described below are arranged.

At least a portion of the transmission area TA of the cover window CW may overlap the active area AA of the display apparatus DA. For example, the transmission area TA of the cover window CW may overlap the front surface of the active area AA of the display apparatus DA. Accordingly, the user may view the image IM through the transmission area TA or provide the external input TC. However, one or more embodiments are not limited thereto. For example, a portion on which the image IM is displayed and a portion on which the external input TC is detected may be separated from each other in the active area AA.

The peripheral area NAA of the display apparatus DA may at least partially overlap the bezel area BZA of the cover window CW. The peripheral area NAA may be covered by the bezel area BZA. The peripheral area NAA may be adjacent to the active area AA. The peripheral area NAA may surround the active area AA. The peripheral area NAA may be an area where no images are displayed. In the peripheral area NAA, a driving circuit or driving wires for driving the active area AA may be arranged.

In an embodiment, the display apparatus DA may be assembled in a flat state in which the active area AA and the peripheral area NAA face the cover window CW. However, one or more embodiments are not limited thereto. A portion of the peripheral area NAA of the display apparatus DA may be bent. In this case, some portions of the peripheral area NAA may face the rear surface of the electronic device 1000, and thus, the bezel area BZA viewed on the front surface of the electronic device 1000 may decrease. Alternatively, the display apparatus DA may be assembled while a portion of the active area AA is curved. Alternatively, the peripheral area NAA may be omitted from the display apparatus DA.

The active area AA of the display surface IS of the display apparatus DA may include the first area A1 and a second area A2. The first area A1 may have relatively higher transmittance than the second area A2. Also, a size (e.g., area) of the first area A1 may be relatively less than that of the second area A2. The first area A1 may be defined as an area overlapping an area of the display apparatus DA where the electronic module SS is arranged inside the housing HU. In an embodiment, the first area A1 may have a circular shape, but one or more embodiments are not limited thereto. The shape of the first area A1 may vary, for example, may be a polygon, an oval, or a figure having at least one curve.

The second area A2 may be adjacent to the first area A1. In an embodiment, the second area A2 may entirely surround the first area A1. However, one or more embodiments are not limited thereto. The second area A2 may partially surround the first area A1.

Referring to FIG. 2B, the display apparatus DA may include the display panel DP and the input sensor ISS. The display panel DP may be configured to generate the image IM. The image IM generated by the display panel DP may be displayed on the display surface IS through the transmission area TA and viewed by the user from the outside.

The input sensor ISS may detect the external input TC transmitted from the outside. The input sensor ISS may detect the external input TC provided to the cover window CW.

Referring back to FIG. 2A, the display panel DP may include a flat portion FN and a bent portion BN. The flat portion FN may be assembled in a state in which the flat portion FN is substantially parallel to a plane defined by the first and second directions DR1 and DR2. The active area AA of the display apparatus DA may be in the flat portion FN of the display panel DP.

The bent portion BN of the display panel DP may extend from the flat portion FN thereof. For example, at least a portion of the bent portion BN may be bent. The bent portion BN may be bent from the flat portion FN and may be on a rear surface of the flat portion FN. Because the bent portion BN overlaps the flat portion FN on a plane when the bent portion BN is assembled, the bezel area BZA of the electronic device 1000 (e.g., the cover window CW) may decrease. However, one or more embodiments are not limited thereto. For example, the bent portion BN may be omitted.

The driving circuit IC may be mounted on the bent portion BN of the display panel DP. The driving circuit IC may be mounted as a chip. However, one or more embodiments are not limited thereto. The driving circuit IC may be provided on a separate circuit board and may be electrically connected to an electronic panel EP through a flexible film or the like.

The driving circuit IC may be electrically connected to the active area AA and may transmit an electrical signal to the active area AA. For example, the driving circuit IC may include a data driving circuit and provide data signals to the pixels PX arranged in the active area AA. Alternatively, the driving circuit IC may include a touch driving circuit and may be electrically connected to the input sensor ISS arranged in the active area AA. The driving circuit IC may be designed to include various circuits other than the above-described circuits or provide various electrical signals to the active area AA.

The electronic device 1000 may further include a main circuit board electrically connected to the display panel DP and the driving circuit IC. The main circuit board may include various driving circuits for driving the electronic panel EP or a connector for supplying power. The main circuit board may be a rigid Printed Circuit Board (PCB) or a flexible circuit board.

The electronic module SS may be arranged under the display apparatus DA. The electronic module SS may receive an external input transmitted through the first area A1 or output a signal through the first area A1. In an embodiment, as the first area A1 having relatively high transmittance is included in the active area AA, the electronic module SS may overlap the active area AA, and accordingly, a size (e.g., an area) of the bezel area BZA may decrease.

Referring to FIG. 2B, the electronic device 1000 may include the display apparatus DA, a power supply module PM, a first electronic module EM1, and a second electronic module EM2. The display apparatus DA, the power supply module PM, the first electronic module EM1, and the second electronic module EM2 may be electrically connected to each other. FIG. 2B exemplarily illustrates the display panel DP and the input sensor ISS from among components of the display apparatus DA.

The power supply module PM may supply power necessary for all operations of the electronic device 1000. The power supply module PM may include a general battery module.

The first electronic module EM1 and the second electronic module EM2 may include various function modules for driving the electronic device 1000. The first electronic module EM1 may be directly mounted on a mother board electrically connected to the display panel DP or on a separate substrate and thus may be electrically connected to the mother board through a connector.

The first electronic module EM1 may include a control module CM, a wireless communication module TM, an image input module IIM, an audio input module AIM, a memory MM, and an external interface IF. Some of the modules may not be mounted on the mother board and may be electrically connected to the mother board through the flexible printed circuit board.

The control module CM may control all operations of the electronic device 1000. The control module CM may include a microprocessor. For example, the control module CM may activate or deactivate the display panel DP. The control module CM may control other modules such as the image input module IIM and the audio input module AIM, in response to a touch signal received from the display panel DP.

The wireless communication module TM may receive/transmit wireless signals from/to other terminals through Bluetooth or Wi-Fi line. The wireless communication module TM may receive and/or transmit audio signals through a general communication line. The wireless communication module TM may include a transmission unit TM1, which modulates a signal to be transmitted and transmits the modulated signal, and a reception unit TM2 that demodulates a received signal.

The image input module IIM may process an image signal to convert the image signal into image data displayable on the display apparatus DA. The audio input module AIM may receive an external audio signal through a microphone in a recording mode or an audio recognition mode and may convert the external audio signal into electrical audio data.

The external interface IF may function as an interface connected to an external charger, a wired/wireless data port, a card socket (e.g., a memory card, a SIM/UIM card, etc.), or the like.

The second electronic module EM2 may include an audio output module AOM, an emission module LM, a light reception module LRM, and a camera module CMM. The second electronic module EM2 may be directly mounted on the mother board or a separate substrate and thus may be electrically connected to the display apparatus DA through a connector or electrically connected to the first electronic module EM1.

The audio output module AOM may convert audio data received from the wireless communication module TM or stored in the memory MM and may output the converted audio data.

The emission module LM may generate and output light. The emission module LM may output infrared rays. For example, the emission module LM may include an LED element. For example, the light reception module LRM may detect infrared rays. The light reception module LRM may be activated when infrared rays having at least a certain level are detected. The light reception module LRM may include a CMOS sensor. After infrared light generated by the emission module LM is irradiated, the infrared light may be reflected from an external object (e.g., a finger or face of a user), and the reflected infrared light may be incident to the light reception module LRM. The camera module CMM may capture an external image.

In an embodiment, the electronic module SS may include at least any one of components of the first and second electronic modules EM1 and EM2. For example, the electronic module SS may include at least any one of a camera, a speaker, a light detection sensor, and a heat detection sensor. The electronic module SS may detect the external object received through the front surface of the electronic device 1000 or provide a sound signal such as voice to the outside through the front surface of the electronic device 1000. Also, the electronic module SS may include a plurality of components and is not limited to any one of the embodiments.

Referring back to FIG. 2A, the housing HU may be coupled to the cover window CW. The cover window CW may be arranged to cover an opening of the housing HU. The housing HU may include a rear surface and side surfaces. On the rear surface of the housing HU, the cover window CW may be arranged. For example, the cover window CW may be arranged on an upper portion of the housing HU. The housing HU may be coupled to the cover window CW and may provide a certain accommodation space. The display apparatus DA and the electronic module SS may be accommodated in the accommodation space between the housing HU and the cover window CW.

The housing HU may include a material having relatively high rigidity. For example, the housing HU may include glass, plastic, or metal or may include frames and/or plates formed of a combination of glass, plastic, and metal. The housing HU may stably protect the components of the electronic device 1000, which are accommodated in an internal space, from external impact.

Figure 3A:
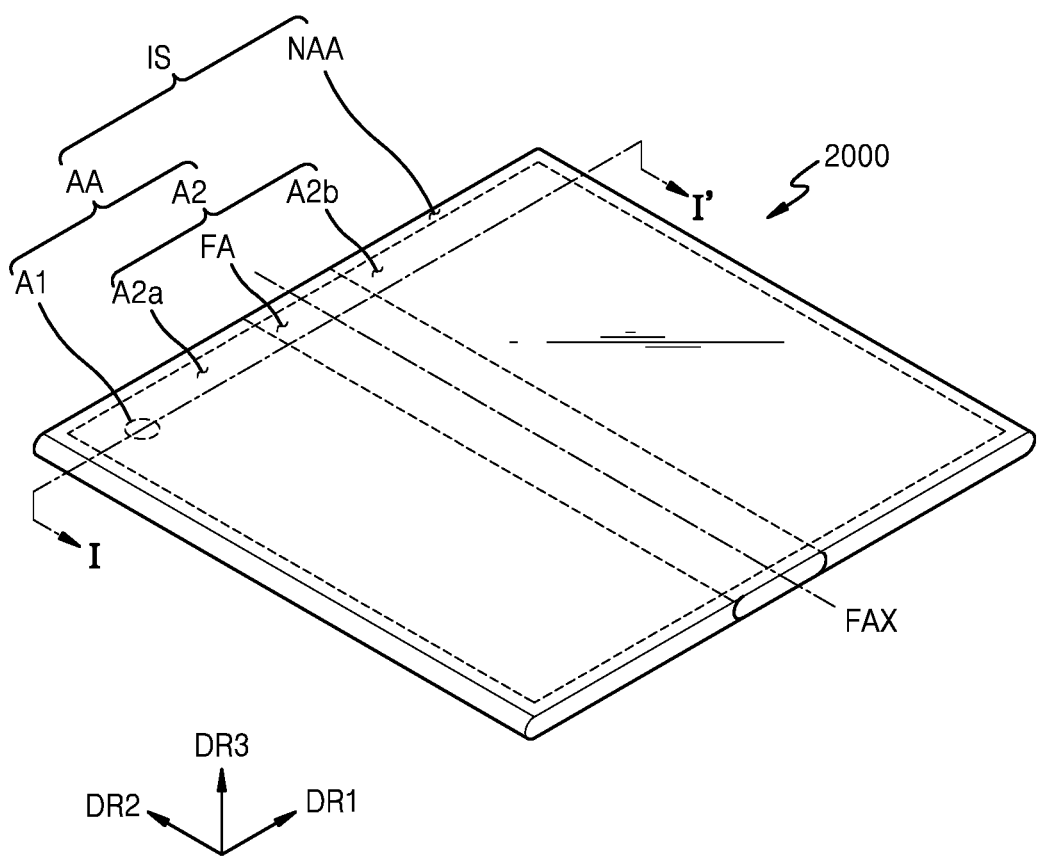
FIG. 3A is a schematic perspective view of another embodiment of the electronic device of FIG. 1.
Figure 3B:
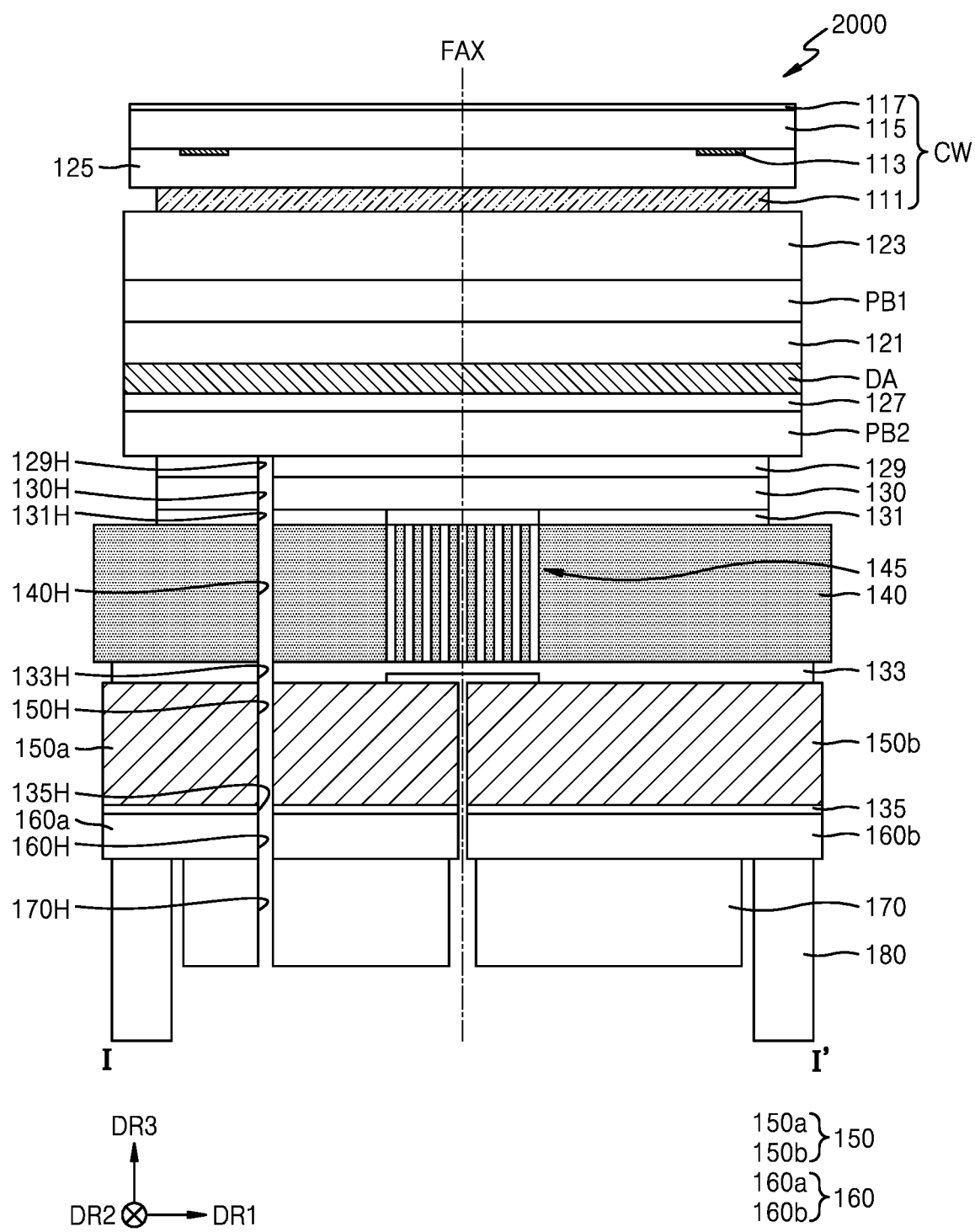
FIG. 3B is a schematic cross-sectional view taken along lines I-I' of FIG. 3A.

FIG. 3A is a schematic perspective view of an electronic device according to an embodiment, and FIG. 3B is a schematic cross-sectional view of the electronic device according to an embodiment. FIG. 3A illustrates a case where an electronic device 2000 is foldable, FIG. 3B illustrates a stack structure of components of the electronic device 2000.

In an embodiment, referring to FIG. 3A, the electronic device 2000 may be a foldable electronic device 2000. The electronic device 2000 may be folded with respect to a folding axis FAX (e.g., at the center of the electronic device 2000). In an embodiment, a display surface IS of the electronic device 2000 may be on an outer side or an inner side of the electronic device 2000.

The electronic device 2000 may include a housing HU, a display apparatus DA, and a cover window CW.

In an embodiment, the display apparatus DA (see, e.g., FIG. 3B) may include an active area AA and a peripheral area NAA. The active area AA may be an area where an image is displayed and also be an area where an external input is detected. The active area AA may be an area where a plurality of pixels described below are arranged.

The active area AA may include a first area A1 and a second area A2. Also, the second area A2 may include a second-first area A2a, a second-second area A2b, and a folding area FA. The second-first area A2a and the second-second area A2b may be respectively arranged on a left side and a right side with respect to the folding axis FAX (e.g., at the center of the electronic device 2000), and the folding area FA may be between the second-first area A2a and the second-second area A2b. However, one or more embodiments are not limited thereto.

FIG. 3A illustrates that the first area A1 has a circular shape on a left upper side of the electronic device 2000, but one or more embodiments are not limited thereto. The first area A1 may vary in number and shape according to the number and shape of the electronic module SS (of FIG. 2A).

Also, FIG. 3A illustrates that the first area A1 is adjacent to the second-first area A2a, but one or more embodiments are not limited thereto. In an embodiment, the first area A1 may be adjacent to the second-second area A2b.

In an embodiment, referring to FIG. 3B, the electronic device 2000 may include the cover window CW, a first protective member PB1, the display apparatus DA, a second protective member PB2, a first supporting member 130, a second supporting member 140, a digitizer 150, a plate 160, a cushion layer 170, and a waterproof member 180.

The first protective member PB1 may be arranged on an upper portion of the display apparatus DA. The first protective member PB1 may be adhered to an upper surface of the display apparatus DA by a first adhesive layer 121. In this case, the first adhesive layer 121 may include a Pressure Sensitive Adhesive (PSA). However, one or more embodiments are not limited thereto. The first adhesive layer 121 may include an Optically Clear Adhesive (OCA).

The first protective member PB1 may be arranged on the upper portion of the display apparatus DA and protect the display apparatus DA from external impact. The first protective member PB1 may include polymer resin. For example, the first protective member PB1 may include polymer resin such as polyethersulfone, polyacrylate, polyetherimide, polyethylene naphthalate, polyethylene terephthalate, polyphenylene sulfide, polyarylate, polyimide, polycarbonate, or cellulose acetate propionate. However, one or more embodiments are not limited thereto. The first protective member PB1 may include a material such as glass or quartz.

The cover window CW may be arranged on an upper portion of the first protective member PB1. The cover window CW may be adhered to the upper portion of the first protective member PB1 by a second adhesive layer 123.

The cover window CW may include a window 111, an opaque layer 113, a window protective member 115, and a hard coating layer 117. The window 111 may include Ultra Thin Glass (UTG™). However, one or more embodiments are not limited thereto. The window 111 may include polymer resin.

The window protective member 115 may be arranged on an upper portion of the window 111. The window protective member 115 may be adhered to an upper surface of the window 111 by a third adhesive layer 125. The window protective member 115 may protect the window 111 from external impact and may protect or reduce the generation of scratches on the upper surface of the window 111. The window protective member 115 may include polymer resin.

However, one or more embodiments are not limited thereto. The window protective member 115 may include an inorganic material.

The opaque layer 113 may be arranged between the window protective member 115 and the third adhesive layer 125. However, one or more embodiments are not limited thereto. The opaque layer 113 may be included on a portion of the window protective member 115. The opaque layer 113 may include an opaque material so that wires, circuits, etc. of the display apparatus DA are not identified from the outside. A portion in which the opaque layer 113 is arranged may be the bezel area BZA.

The hard coating layer 117 may be arranged on an upper portion of the window protective member 115. The hard coating layer 117 may include an organic material such as polymer resin. However, one or more embodiments are not limited thereto. The hard coating layer 117 may include an inorganic material.

The hard coating layer 117 may be an outermost layer of the cover window CW. In this case, the outermost layer of the cover window CW may denote an outermost layer of the electronic device 2000. The outermost layer of the cover window CW is a layer that the user directly touches, and when the outermost layer of the cover window CW includes UTG™ or the window protective member 115, a touch feeling of the user may be degraded. As the outermost layer of the cover window CW is the hard coating layer 117, soft and smooth feelings may be provided to the user.

The second protective member PB2 may be arranged on a lower portion of the display apparatus DA. The second protective member PB2 may be adhered to a lower surface of the display apparatus DA by a fourth adhesive layer 127. The second protective member PB2 may be arranged on the lower portion of the display apparatus DA to support and protect the display apparatus DA from external impact. The second protective member PB2 may include polymer resin such as polyethylene terephthalate or polyimide.

The first supporting member 130 may be arranged on a lower portion of the second protective member PB2. The first supporting member 130 may be adhered to the second protective member PB2 by a fifth adhesive layer 129. The first supporting member 130 may be arranged on the lower portion of the display apparatus DA and support the display apparatus DA. The first supporting member 130 may include polymer resin such as polyethylene terephthalate or polyimide.

The second supporting member 140 may be arranged on a lower portion of the first supporting member 130. The second supporting member 140 may be adhered to the first supporting member 130 by a sixth adhesive layer 131. In an embodiment, the sixth adhesive layer 131 may not exist in a portion corresponding to the folding area FA (see FIG. 3A).

The second supporting member 140 may be arranged on the lower portion of the display apparatus DA and may support the display apparatus DA. Also, the second supporting member 140 may be arranged on an upper portion of the digitizer 150 described below and thus may protect the digitizer 150 from external impact.

In an embodiment, the second supporting member 140 may include a folding structure 145. When the electronic device 2000 is folded, a shape or a length of the folding structure 145 may change. For example, the folding structure 145 may include a pattern portion including an opening, an uneven portion, or links rotatably connected to each other. However, one or more embodiments are not limited thereto.

For example, when the electronic device 2000 is folded, the folding structure 145 may be folded with respect to the folding axis FAX (e.g., at the center of the electronic device 2000). In an embodiment, both sides of the folding structure 145 may be symmetrical to each other with respect to the folding axis FAX (e.g., at the center of the electronic device 2000). In an embodiment, the second supporting member 140 except the folding structure 145 may have a flat upper surface.

In an embodiment, the second supporting member 140 may include at least one of glass, plastic, and metal. In an embodiment, the second supporting member 140 may include polyurethane or Carbon Fiber Reinforced Plastic (CFRP). In an embodiment, the folding structure 145 may include the same material as or a different material from the second supporting member 140.

The digitizer 150 may be arranged on the lower portion of the second supporting member 140. The digitizer 150 may be adhered to the lower portion of the second supporting member 140 by a seventh adhesive layer 133. The seventh adhesive layer 133 may be arranged on the lower portion of the second supporting member 140 and may prevent or reduce the introduction of foreign materials into the folding structure 145 of the second supporting member 140.

The digitizer 150 may include a body layer and/or a pattern layer. The digitizer 150 may detect a signal that is input from an external electronic pen, etc., through a pattern layer. In detail, the digitizer 150 may detect an intensity, a direction, and the like of the signal input from the electronic pen, etc.

When the electronic device 2000 is folded while the digitizer 150 is integrally included, cracks may appear on the body layer and/or the pattern layer of the digitizer 150. In an embodiment, the digitizer 150 may include a first digitizer 150a on a left side of the folding axis FAX and a second digitizer 150b on a right side of the folding axis FAX with respect to the folding axis FAX (e.g., at the center of the electronic device 2000). The first digitizer 150a may at least partially overlap the second-first area A2a of FIG. 3A, and the second digitizer 150b may at least partially overlap the second-second area A2b. Also, the first digitizer 150a may at least partially overlap the folding area FA (of FIG. 3A), and the second digitizer 150b may at least partially overlap the folding area FA (of FIG. 3A).

In an embodiment, the first digitizer 150a and the second digitizer 150b may be apart from each other in the first direction DR1 with the folding axis FAX therebetween. For example, the digitizer 150 may not be integrally formed, but may be separated. As the digitizer 150 has a separable configuration, the generation of cracks on the body layer and/or the pattern layer in the folding area FA may be prevented or reduced.

Also, because the digitizer 150 has the separable configuration but at least partially overlaps the folding area FA (of FIG. 3A), signals may be received in the folding area FA, and thus, the user convenience may be improved.

The plate 160 may be arranged on a lower portion of the digitizer 150. The plate 160 may be adhered to a lower surface of the digitizer 150 by an eighth adhesive layer 135. In an embodiment, the eighth adhesive layer 135 may not exist in a portion corresponding to the folding area FA (see FIG. 3A).

The plate 160 may deliver, to the outside, heat generated from the digitizer 150. In this case, the plate 160 may include metal having great thermal transmission efficiency. Alternatively, the plate 160 may include graphite having high thermal conductivity in a planar direction. When the plate 160 includes graphite, a thickness of the plate 160 may be less than that of the plate 160 including metal. Also, the plate 160 may be arranged on the lower portion of the digitizer 150 to support the digitizer 150 and thus may protect the digitizer 150 from external impact.

The plate 160 may include a first plate 160a on a left side of the folding axis FAX and a second plate 160b on a right side of the folding axis FAX with respect to the folding axis FAX (e.g., at the center of the electronic device 2000).

The cushion layer 170 may be arranged on a lower portion of the plate 160. The cushion layer 170 may prevent or reduce the damage to the digitizer 150 from the external impact, wherein the digitizer 150 is arranged on the cushion layer 170. In an embodiment, the cushion layer 170 may include a PSA.

The waterproof member 180 may be arranged on an outer side of the cushion layer 170. The waterproof member 180 may block or absorb moisture entering from the outside of the electronic device 2000 and thus may prevent or reduce the damage to the components of the electronic device 2000 by the moisture. In this case, the waterproof member 180 may include a tape, a sponge, or the like.

In an embodiment, through holes 129H, 130H, 131H, 140H, 133H, 150H, 135H, 160H, and 170H, which correspond to the first area A1, may be included in the fifth adhesive layer 129, the first supporting member 130, the sixth adhesive layer 131, the second supporting member 140, the seventh adhesive layer 133, the digitizer 150, the eighth adhesive layer 135, the plate 160, and the cushion layer 170, respectively. However, one or more embodiments are not limited thereto. No through hole may be included in at least one of the fifth adhesive layer 129, the first supporting member 130, the sixth adhesive layer 131, the second supporting member 140, the seventh adhesive layer 133, the digitizer 150, the eighth adhesive layer 135, the plate 160, and the cushion layer 170. Also, for example, a through hole may be additionally included in the second protective member PB2.

Also, FIG. 3B illustrates that the through holes 129H, 130H, 131H, 140H, 133H, 150H, 135H, 160H, and 170H, which correspond to the first area A1, are arranged in a left side of the electronic device 2000, but one or more embodiments are not limited thereto. In an embodiment, the through holes 129H, 130H, 131H, 140H, 133H, 150H, 135H, 160H, and 170H, which correspond to the first area A1, may be included in a right side of the electronic device 2000.

As the through holes 129H, 130H, 131H, 140H, 133H, 150H, 135H, 160H, and 170H, which correspond to the first area A1, are respectively included in the fifth adhesive layer 129, the first supporting member 130, the sixth adhesive layer 131, the second supporting member 140, the seventh adhesive layer 133, the digitizer 150, the eighth adhesive layer 135, the plate 160, and the cushion layer 170, the transmittance of the first area A1 may be improved, and thus, the electronic device 1000 (see FIG. 2A), which includes the electronic module SS having the improved performance, may be implemented.

Figure 4:
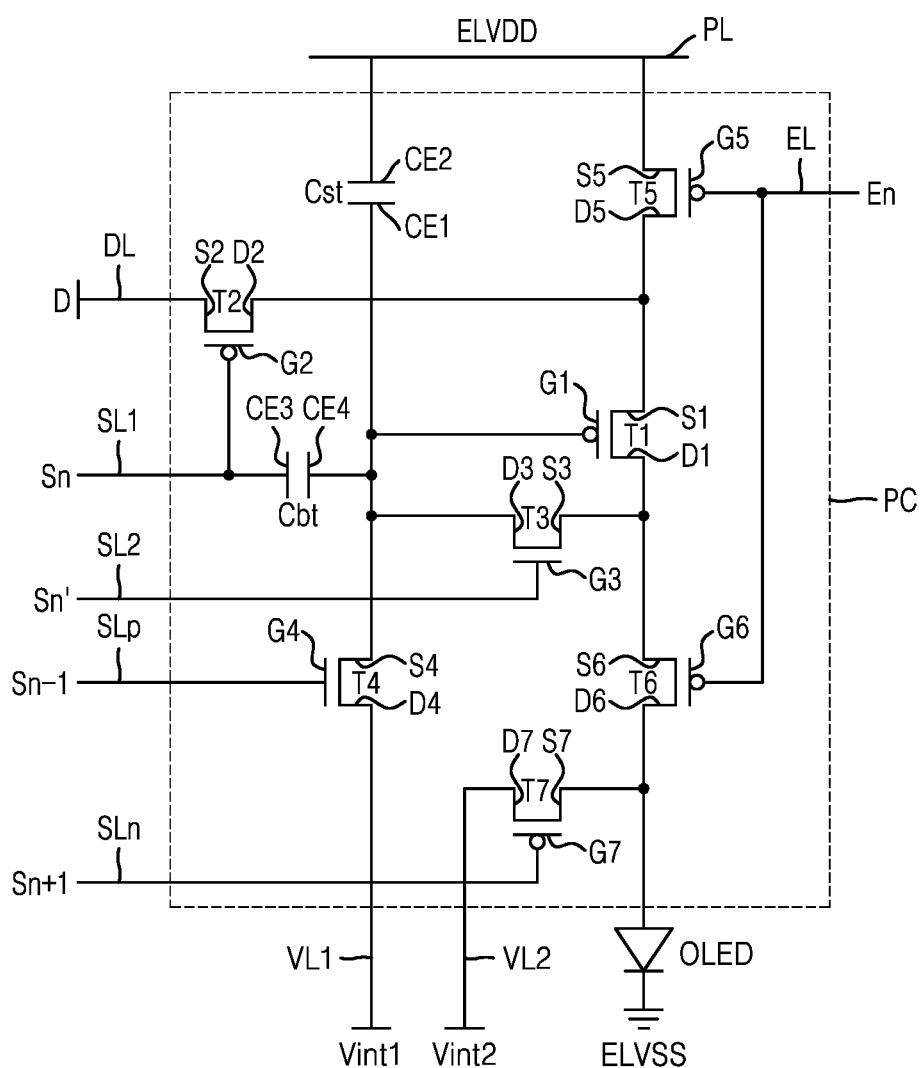
FIG. 4 is an equivalent circuit diagram of a representative pixel of a display apparatus of the electronic device.

FIG. 4 is an equivalent circuit diagram of a pixel according to an embodiment. In detail, FIG. 4 is an equivalent circuit diagram of a pixel PX of the display apparatus DA (of FIG. 2A). The equivalent circuit diagram of the pixel PX of FIG. 4 may be identically applied to a first pixel PXa (of FIG. 5) in the first area A1 as well as a second pixel PXm (of FIG. 5) in the second area A2 with a mere difference in size.

In an embodiment, a pixel circuit PC may include a first transistor T1, a second transistor T2, a third transistor T3, a fourth transistor T4, a fifth transistor T5, a sixth transistor T6, a seventh transistor T7, a first storage capacitor Cst, and a second storage capacitor Cbt. In an embodiment, at least one of the first to seventh transistors T1 to T7 may be omitted.

The first to seventh transistors T1 to T7 and the first and second storage capacitors Cst and Cbt may be connected to signal lines, a first initialization voltage line VL1, a second initialization voltage line VL2, and a driving power line PL. The signal lines may include a data line DL, a first scan line SL1, a second scan line SL2, a previous scan line SLp, a subsequent scan line SLn, and an emission control line EL. In an embodiment, the signal lines, the first and second initialization voltage lines VL1 and VL2, and/or the driving power line PL may be shared by adjacent pixels.

The driving power line PL may be configured to transmit a first power voltage ELVDD to the first transistor T1. The first initialization voltage line VL1 may be configured to transmit, to the pixel circuit PC, a first initialization voltage Vint1 used to initialize the first transistor T1. The second initialization voltage line VL2 may be configured to transmit, to the pixel circuit PC, a second initialization voltage Vint2 used to initialize an organic light-emitting diode OLED.

The third and fourth transistors T3 and T4 of the first to seventh transistors T1 to T7 may each be configured as an n-channel MOSFET (NMOS), and others thereof may each be configured as a p-channel MOSFET (PMOS). However, one or more embodiments are not limited thereto. In an embodiment, the third, fourth, and seventh transistors T3, T4, and T7 may each be configured as an NMOS, and other transistors may be configured as a PMOS.

In the descriptions, the expression "being electrically connected between a transistor and a signal or between transistors" may indicate that "a source, a drain, and a gate of a transistor are formed integrally with a signal line or connected to each other through a connection electrode."

The first transistor T1 may be configured to control an amount of a driving current flowing to the organic light-emitting diode OLED from the driving voltage line PL according to a gate voltage. The first transistor T1 may include a gate G1 connected to a first electrode CE1 of the first storage capacitor Cst and a source S1 connected to the driving power line PL through the fifth transistor T5. Also, the first transistor T1 may include a drain D1 connected to the organic light-emitting diode OLED through the sixth transistor T6.

The second transistor T2 may be configured to receive a data voltage D in response to a first scan signal Sn. The second transistor T2 may be configured to transmit the data voltage D to the source S1 of the first transistor T1 in response to the first scan signal Sn. The second transistor T2 may include a gate G2 connected to the first scan line SL1, a source S2 connected to the data line DL, and a drain D2 connected to the source S1 of the first transistor T1.

The first storage capacitor Cst may be connected between the driving power line PL and the first transistor T1. The first storage capacitor Cst may include a second electrode CE2 connected to the driving power line PL and the first electrode CE1 connected to the gate G1 of the first transistor T1. The first storage capacitor Cst may be configured to store a difference between the first driving voltage ELVDD, which is applied to the driving power line PL, and a gate voltage of the first transistor T1 and may maintain the gate voltage of the first transistor T1.

The third transistor T3 may be serially connected between the drain D1 and the gate G1 of the first transistor T1 and may connect the drain D1 and the gate G1 of the first transistor T1 to each other in response to a second scan signal Sn'. The third transistor T3 may include a gate G3 connected to the second scan line SL2, a source S3 connected to the drain D1 of the first transistor T1, and a drain D3 connected to the gate G1 of the first transistor T1. The third transistor T3 may be configured as a plurality of transistors connected to each other in series and simultaneously controlled in response to the second scan signal Sn'. Alternatively, the third transistor T3 may be omitted.

When the third transistor T3 is turned on in response to the second scan signal Sn', the drain D1 and the gate G1 of the first transistor T1 are connected to each other, and thus, the first transistor T1 may be diode-connected.

The fourth transistor T4 may be configured to apply the first initialization voltage Vint1 to the gate G1 of the first transistor T1 in response to the previous scan signal Sn−1. The fourth transistor T4 may include a gate G4 connected to the previous scan line SLp, a source S4 connected to the gate G1 of the first transistor T1, and a drain D4 connected to the first initialization voltage line VL1. The fourth transistor T4 may be configured as a plurality of transistors connected to each other in series and simultaneously controlled in response to the previous scan signal Sn−1. Alternatively, the fourth transistor T4 may be omitted.

The fifth transistor T5 may be configured to connect the driving power line PL to the source S1 of the first transistor T156 in response to the emission control signal En. The fifth transistor T5 may include a gate G5 connected to the emission control line EL, a source S5 connected to the driving power line PL, and a drain D5 connected to the source S1 of the first transistor T1. Alternatively, the fifth transistor T5 may be omitted.

The sixth transistor T6 may be configured to connect the drain D1 of the first transistor T1 to an anode of the organic light-emitting diode OLED in response to the emission control signal En. The sixth transistor T6 may be configured to transmit, to the anode of the organic light-emitting diode OLED, a driving current output from the first transistor T1. The sixth transistor T6 may include a gate G6 connected to the emission control line EL, a source S6 connected to the drain D1 of the first transistor T1, and a drain D6 connected to the anode of the organic light-emitting diode OLED. Alternatively, the sixth transistor T6 may be omitted.

The seventh transistor T7 may be configured to apply the second initialization voltage Vint2 to the anode of the organic light-emitting diode OLED, in response to a subsequent scan signal Sn+1. The seventh transistor T7 may include a gate G7 connected to the subsequent scan line SLn, a source S7 connected to the anode of the organic light-emitting diode OLED, and a drain D7 connected to the second initialization voltage line VL2. Alternatively, the seventh transistor T7 may be omitted.

As illustrated in FIG. 4, the seventh transistor T7 may be connected to the subsequent scan line SLn. Alternatively, the seventh transistor T7 may be connected to the emission control line EL and driven in response to the emission control signal En. Alternatively, the seventh transistor T7 may be connected to the previous scan line SLp and driven in response to the previous scan signal Sn−1.

Locations of the sources and the drains of the first to seventh transistors T1 to T7 may change according to types (e.g., a P-type or an N-type) thereof.

The second storage capacitor Cbt may include a third electrode CE3 and a fourth electrode CE4. The fourth electrode CE4 of the second storage capacitor Cbt may be connected to the first electrode CE1 of the first storage capacitor Cst, and the third electrode CE3 of the second storage capacitor Cbt may receive the first scan signal Sn. The second storage capacitor Cbt may compensate for a voltage drop of a gate terminal by increasing a voltage of the gate terminal of the first transistor T1 at a point in time when the first scan signal Sn stops being applied. Alternatively, the second storage capacitor Cbt may be omitted.

Figure 5:
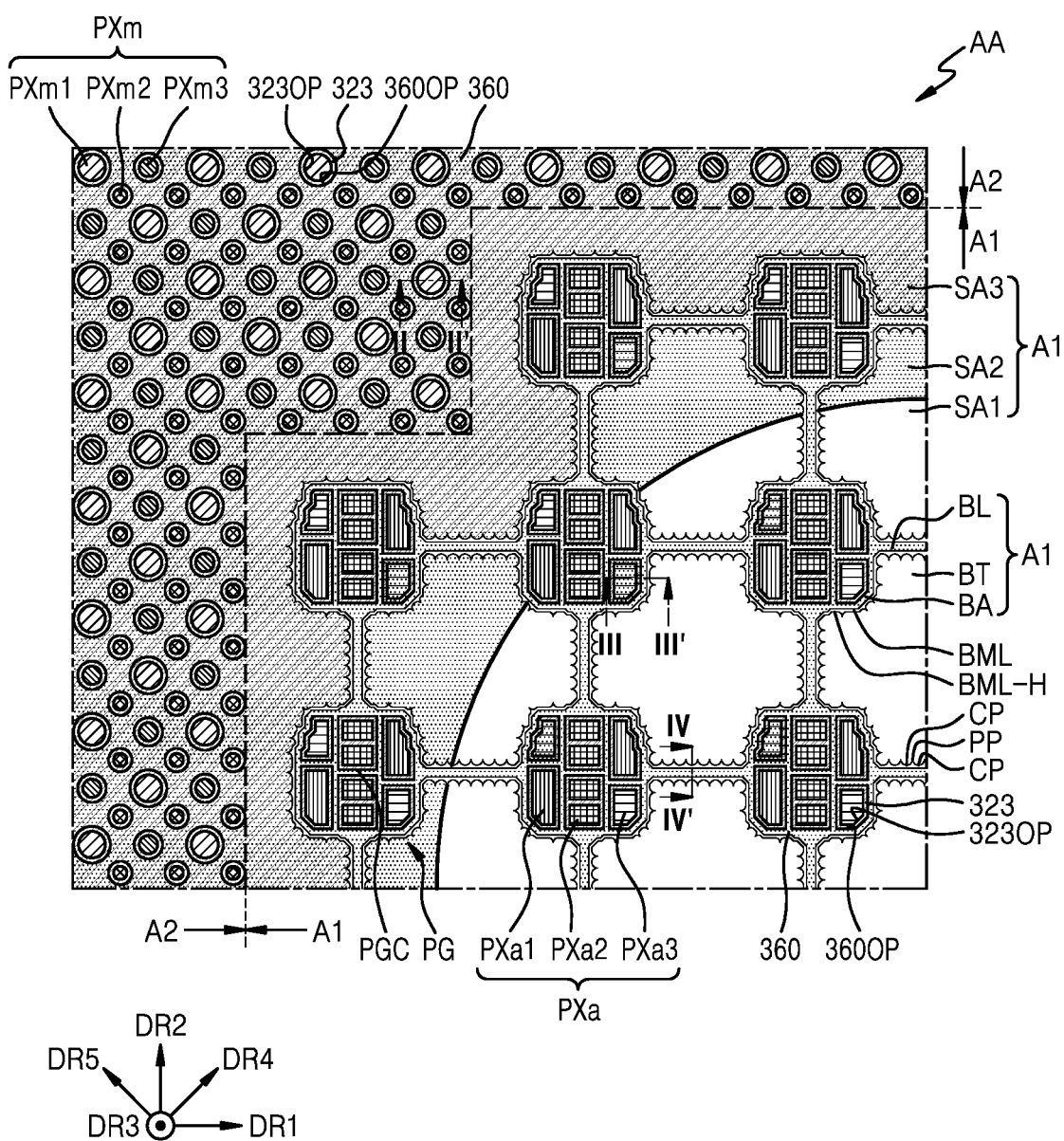
FIG. 5 is a plan view of an embodiment of an active area in the electronic device.
Figure 6:
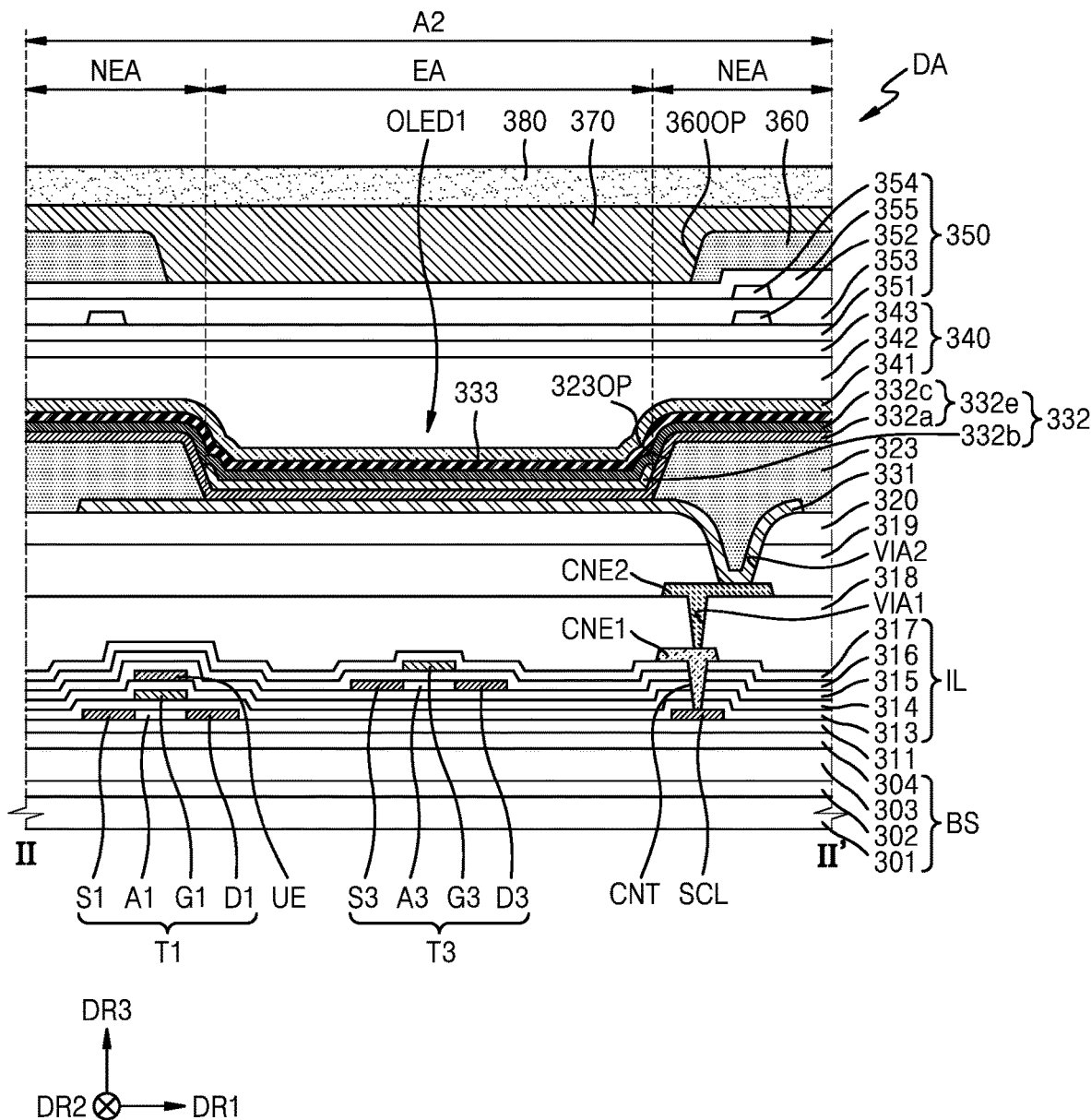
FIG. 6 is a cross-sectional view taken along lines II-II' of FIG. 5 illustrating the active area in the electronic device.
Figure 7:
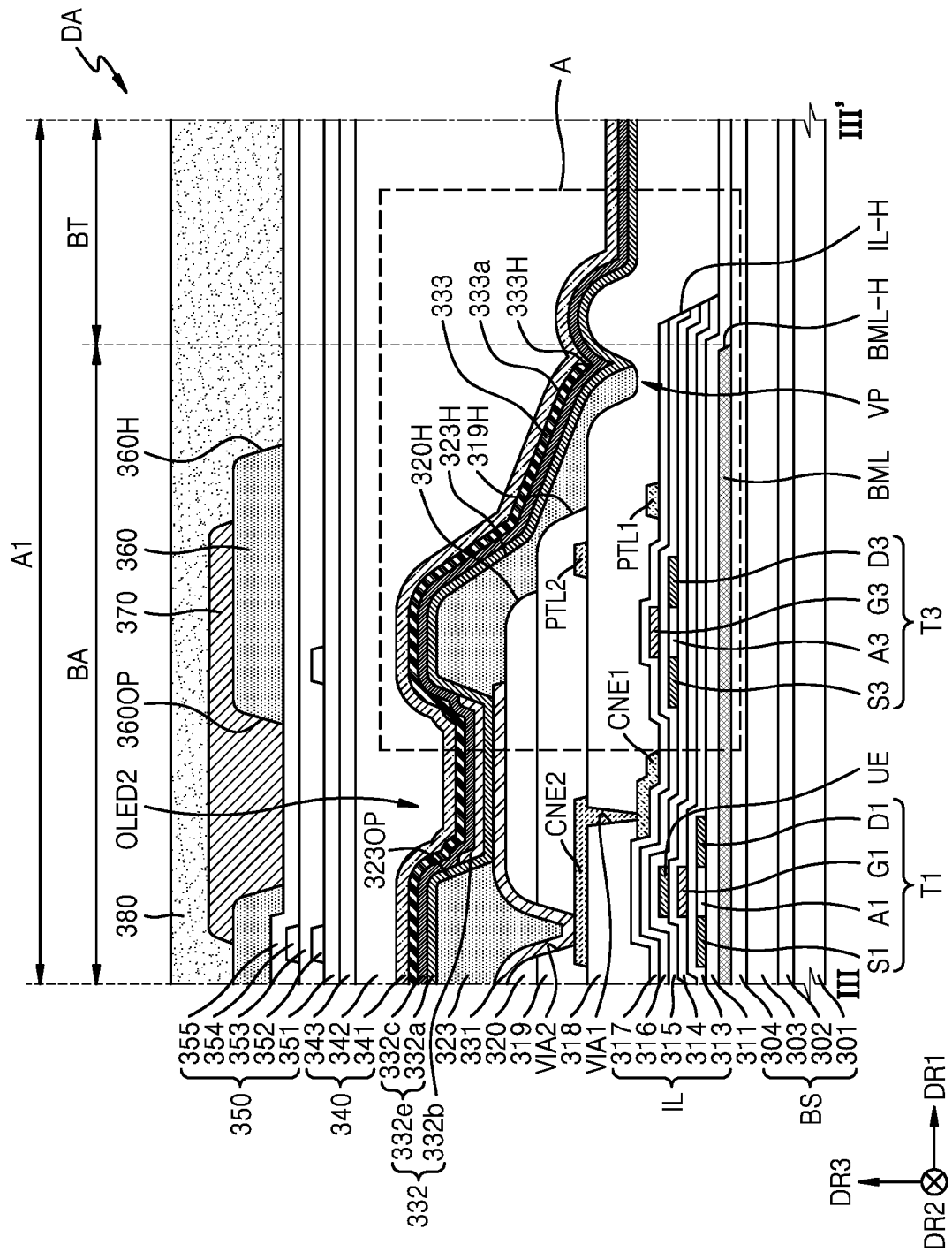
FIG. 7 is a cross-sectional view taken along lines of FIG. 5 illustrating the active area in the electronic device.

FIG. 5 is a plan view of an active area AA included in the electronic device 1000 or 2000 according to an embodiment, FIG. 6 is a cross-sectional view of an active area AA included in the electronic device 1000 or 2000 according to an embodiment, and FIG. 7 is a cross-sectional view of an active area AA included in the electronic device 1000 or 2000 according to an embodiment. FIG. 6 is a cross-sectional view of the second area A2, taken along a line of FIG. 5. FIG. 7 is a cross-sectional view of the first area A1, taken along a line III-III' of FIG. 5.

FIGS. 6 and 7 only illustrate the first transistor T1 and the third transistor T3 among the first to seventh transistors T1 to T7 described with reference to FIG. 4. The first transistor T1 and the third transistor T3 of FIG. 7 are illustrated to describe that the pixel PX includes a first semiconductor pattern including a silicon semiconductor and a second semiconductor pattern including an oxide semiconductor. Locations of the first transistor T1 and the third transistor T3 are not limited to the illustration of FIG. 7.

Referring to FIGS. 5, 6, and 7, the electronic device 1000 or 2000 according to an embodiment may include a display apparatus DA, and the display apparatus DA may include a substrate BS, a light blocking layer BML, the first pixel PXa, the second pixel PXm, a pixel-defining layer 323, and a black matrix 360.

In an embodiment, the substrate BS may include first and second areas A1 and A2. In this case, because the display apparatus DA (see FIG. 2A) includes the substrate BS, it may be understood that the display apparatus DA includes the first and second areas A1 and A2.

In an embodiment, the first area A1 may include a display area BA, a wire area BL, and a transmission area BT. Also, the first area A1 may include a first sub-area SA1, a second sub-area SA2, and a third sub-area SA3. The first sub-area SA1, the second sub-area SA2, and the third sub-area SA3 may be areas defined by an overlapping relationship between the pixel-defining layer 323 and the black matrix 360, and each of the first sub-area SA1 and the second sub-area SA2 may at least partially overlap the transmission area BT.

In an embodiment, the light blocking layer BML may be arranged on the substrate BS. The light blocking layer BML may be arranged in the display area BA and the wire area BL of the first area A1. For example, the light blocking layer BML may overlap the display area BA and the wire area BL of the first area A1 and may not overlap the transmission area BT of the first area A1.

In an embodiment, the light blocking layer BML may include a first hole BML-H corresponding to the transmission area BT. For example, the first hole BML-H may be defined in the light blocking layer BML. For example, a shape and/or a size of the transmission area BT may be defined by the first hole BML-H defined in the light blocking layer BML.

In an embodiment, edges of the light blocking layer BML may include uneven edges that are concave and convex. For example, the edges of the light blocking layer BML may have a configuration in which concave portions CP, which are concave in a direction away from the center of the transmission area BT, are adjacent to each other. The edges of the light blocking layer BML may have a configuration in which the concave portions CP are continuously and/or regularly arranged, and convex portions PP towards the center of the transmission area BT may be arranged between the adjacent concave portions PP. In this case, the above-described configuration may be referred to as an EMBO configuration.

In an embodiment, as illustrated in FIG. 5, the convex portion PP may have a relatively sharp shape. However, one or more embodiments are not limited thereto. The convex portion PP may have a relatively rounded shape. In an embodiment, the concave portion CP may have a relatively semicircular shape. However, one or more embodiments are not limited thereto. For example, the concave portion CP may have various shapes such as a substantially half ellipse, roughly a triangle, and roughly a rectangle.

In an embodiment, as the edges of the light blocking layer BML include the concave portions CP and the convex portions PP, the diffraction of light to the electronic module SS (of FIG. 2A) through the first hole BML-H defined in the light blocking layer BML may be reduced, and thus, a resolution of light received by the electronic module SS may increase. For example, when the electronic module SS includes the camera module CMM (of FIG. 2B), the edges of the light blocking layer BML have an embossing configuration, and a resolution of light received by the camera module CMM increases. Accordingly, properties (e.g., quality) of the camera module CMM may be improved.

In an embodiment, the display apparatus may include the first pixel PXa and the second pixel PXm. The first pixel PXa may be arranged in the first area A1, and the second pixel PXm may be arranged in the second area A2. The first pixel PXa and the second pixel PXm may have different emission areas and different arrangements.

The first pixel PXa may be provided in plural in the first area A1, and the first pixels PXa may be arranged apart from each other in the first direction DR1 and/or the second direction DR2. The first pixel PXa may include a plurality of sub-pixels PXa1 to PXa3.

In an embodiment, the first pixel PXa may be arranged in the display area BA, and signal lines and/or voltage lines may be arranged in the wire area BL. The transmission area BT may be an area having higher transmittance than the display area BA and/or the wire area BL, and the transmission area BT may be defined as an area where conductive materials or insulating layers are patterned or are not deposited to increase the transmittance. The transmission area BT of the first area A1 may be surrounded by the display area BA and the wire area BL.

The transmission area BT may vary in shape. For example, the transmission area BT may have a polygonal shape on a plane. Also, the transmission area BT may have a circular shape or an oval shape.

In the first area A1, the display areas BA may be separated from each other. Each display area BA may be surrounded by the transmission area BT, and sub-pixels, for example, a first-first sub-pixel PXa1, a first-second sub-pixel PXa2, and a first-third sub-pixel PXa3, which emit light of different colors, may be arranged in the display area BA. In this case, the first-first sub-pixel PXa1 may emit blue light, the first-second sub-pixel PXa2 may emit green light, and the first-third sub-pixel PXa3 may emit red light. In an embodiment, two first-first sub-pixels PXa1, four first-second sub-pixels PXa2, and two first-third sub-pixels PXa3 may be arranged in the display area BA. For example, two first-first sub-pixels PXa1, four first-second sub-pixels PXa2, and two first-third sub-pixels PXa3 may form one pixel group PG.

However, one or more embodiments are not limited thereto. The number of each of the first-first, first-second, and first-third sub-pixels PXa1, PXa2, and PXa3 arranged in each display area BA may vary.

The first-first, first-second, and first-third sub-pixels PXa1, PXa2, and PXa3 may be symmetrical to each other with respect to the center PGC of the pixel group PG. For example, in one display area BA, two first-first sub-pixels PXa1, four first-second sub-pixels PXa2, and two first-third sub-pixels PXa3 may be symmetrical to each other with respect to the center PGC. For example, two first-first sub-pixels PXa1 may be apart from each other with respect to the center PGC in the fourth direction DR4, and two first-third sub-pixels PXa3 may be apart from each other with respect to the center PGC in the fifth direction DR5. Also, four first-second sub-pixels PXa2 may be apart from each other in the second direction DR2.

In an embodiment, a length of the first-first sub-pixel PXa1 in the second direction DR2 may be greater than a length of the first-third sub-pixel PXa3 in the second direction DR2. In an embodiment, an emission area of the first-first sub-pixel PXa1 may be greater than that of the first-third sub-pixel PXa3, and the emission area of the first-third sub-pixel PXa3 may be greater than that of the first-second sub-pixel PXa2. However, one or more embodiments are not limited thereto.

In an embodiment, the first-first sub-pixel PXa1, the first-second sub-pixel PXa2, and the first-third sub-pixel PXa3 may each have a substantially rectangular shape on a plane. For example, the shape of each of the first-first sub-pixel PXa1 and the first-third sub-pixel PXa3 may be a rectangle having a short side in the first direction DR1 and a long side in the second direction DR2, and the shape of the first-second sub-pixel PXa2 may be a rectangle having a long side in the first direction DR1 and a short side in the second direction DR2. However, one or more embodiments are not limited thereto.

In an embodiment, a shape of at least one of the first-first sub-pixel PXa1, the first-second sub-pixel PXa2, and the first-third sub-pixel PXa3 may be an n-sided polygon (where, n is a natural number equal to or greater than 5) on a plane. For example, the first-second sub-pixel PXa2 may have a rectangular shape, and edges of the first-first sub-pixel PXa1 and the first-third sub-pixel PXa3, which are adjacent to the transmission area BT, may be bent at least once. Therefore, the shape of each of the first-first sub-pixel PXa1 and the first-third sub-pixel PXa3 may be an n-sided polygon (where, n is a natural number equal to or greater than 5) on a plane.

The second pixel PXm may be provided in plural in the second area A2, and the second pixels PXm may be apart from each other in the fourth direction DR4 and/or the fifth direction DR5. The second pixel PXm may include a plurality of sub-pixels PXm1 to PXm3.

The second-first sub-pixel PXm1, the second-second sub-pixel PXm2, and the 2-3 sub-pixel PXm3 may be arranged in the second area A2 according to a certain rule. For example, the second-first sub-pixel PXm1, the second-second sub-pixel PXm2, and the 2-3 sub-pixel PXm3 may be arranged in the form of PenTile™.

For example, the second-first sub-pixel PXm1 and the second-second sub-pixel PXm2, which are adjacent to each other, may be apart from each other in the fifth direction DR5, and the 2-3 sub-pixel PXm3 and the second-second sub-pixel PXm2, which are adjacent to each other, may be apart from each other in the fourth direction DR4. Also, the second-first sub-pixel PXm1 and the 2-3 sub-pixel PXm3 may be alternately arranged in the first direction DR1 and/or the second direction DR2.

The second-first sub-pixel PXm1, the second-second sub-pixel PXm2, and the 2-3 sub-pixel PXm3 may each have a circular shape. However, one or more embodiments are not limited thereto. For example, at least one of the second-first sub-pixel PXm1, the second-second sub-pixel PXm2, and the 2-3 sub-pixel PXm3 may have a square shape, a rectangular shape, or a rhombus shape.

In an embodiment, the pixel-defining layer 323 may be arranged on the substrate BS. The pixel-defining layer 323 may be arranged in the first and second areas A1 and A2. As described below, the pixel-defining layer 323 may not be arranged in the wire area BL, the first sub-area SA1, and the second sub-area SA2.

In an embodiment, the pixel-defining layer 323 may include a first opening 3230P defining an emission area of each of the first and second pixels PXa and PXm. For example, the emission area of each of the first and second pixels PXa and PXm may be defined through the first opening 3230P defined in the pixel-defining layer 323. For example, the emission area of each of the sub-pixels PXa1, PXa2, PXa3, PXm1, PXm2, and PXm3 may be defined through the first opening 323OP defined in the pixel-defining layer 323.

In an embodiment, the black matrix 360 may be arranged on the pixel-defining layer 323. The pixel-defining layer 323 and the black matrix 360 may at least partially overlap each other in the third direction DR3 substantially perpendicular to the substrate BS. The black matrix 360 may be arranged in the first area A1 and the second area A2. As described below, the black matrix 360 may not be arranged in the first sub-area SA1.

In an embodiment, the black matrix 360 may include a second opening 3600P overlapping the first opening 323OP defined in the pixel-defining layer 323. For example, the second opening 360OP may be defined in the black matrix 360 and may at least partially overlap the first opening 323OP defined in the pixel-defining layer 323. In an embodiment, a size (e.g., area) of the second opening 360OP defined in the black matrix 360 may be greater than a size (e.g., area) of the first opening 323OP defined in the pixel-defining layer 323. However, one or more embodiments are not limited thereto. The size (e.g., area) of the second opening 360OP defined in the black matrix 360 may be identical to or less than the size (e.g., area) of the first opening 323OP defined in the pixel-defining layer 323.

In an embodiment, as described above, the first area A1 may include the first sub-area SA1, the second sub-area SA2, and the third sub-area SA3. In an embodiment, the first sub-area SA1 and the second sub-area SA2 may overlap the transmission area BT. For example, it may be understood that the transmission area BT includes the first sub-area SA1 and the second sub-area SA2.

In an embodiment, the first sub-area SA1 may be an area where the pixel-defining layer 323 and the black matrix 360 are not arranged. The second sub-area SA2 may be an area where the pixel-defining layer 323 is not arranged and the black matrix 360 is arranged. The third sub-area SA3 may be an area where both the pixel-defining layer 323 and the black matrix 360 are arranged. For example, the pixel-defining layer 323 and the black matrix 360 may overlap each other in the third sub-area SA3, but may not overlap in the first sub-area SA1 and the second sub-area SA2. Because the pixel-defining layer 323 and the black matrix 360 are not arranged in the first sub-area SA1, the transmittance of the first sub-area SA1 may be higher than the transmittance of the second sub-area SA2 and the third sub-area SA3.

Referring to FIGS. 5 and 6, in an embodiment, the electronic device 1000 (of FIG. 2A) may include the display apparatus DA, and the display apparatus DA may include the substrate BS, a buffer layer 311, inorganic insulating layers IL, organic light-emitting diodes OLED1, an encapsulation member 340, an input sensor 350 (e.g., corresponding to the input sensor ISS of FIG. 2B), the black matrix 360, a color filter 370, and an overcoat layer 380.

The substrate BS may have a structure in which a layer including an organic material and a layer including an inorganic material are alternatively stacked. For example, the substrate BS may include a first base layer 301, a first barrier layer 302, a second base layer 303, and a second barrier layer 304 that are sequentially stacked.

The first base layer 301 may include an organic material. For example, the first base layer 301 may include any one of polyimide, polyethylene naphthalate, polyethylene terephthalate, polyarylate, polycarbonate, polyetherimide, and polyethersulfone.

The first barrier layer 302 may be arranged on the first base layer 301. The first barrier layer 302 may include an inorganic material. For example, the first barrier layer 302 may include silicon oxide ($SiO_2$), silicon oxynitride ($SiO_xN_y$), silicon nitride ($SiN_x$), amorphous silicon, or the like. In an embodiment, the first barrier layer 302 may include a first layer and a second layer, and the second layer may have a refractive index less than that of the first layer. For example, the first layer may include $SiO_xN_y$, and the second layer may include $SiO_2$ having a less refractive index than $SiO_xN_y$.

The second base layer 303 may be arranged on the first barrier layer 302. The second base layer 303 may include the same material as the first base layer 301. However, one or more embodiments are not limited thereto. The second base layer 303 may include a different material from the first base layer 301. In an embodiment, a thickness of the second base layer 303 may be less than that of the first base layer 301.

The second barrier layer 304 may be arranged on the second base layer 303. The second barrier layer 304 may include an inorganic material. For example, the second barrier layer 304 may include $SiO_2$, $SiO_xN_y$, $SiN_x$, or the like. In an embodiment, the second barrier layer 304 may include a first layer and a second layer, and the second layer may have a less refractive index than the first layer. For example, the first layer may include $SiO_xN_y$, and the second layer may include $SiO_2$ having a less refractive index than $SiO_xN_y$.

The buffer layer 311 may be arranged on the substrate BS. The buffer layer 311 may decrease or prevent the penetration of impurities, moisture, or external air from the bottom of the substrate BS. The buffer layer 311 may include an inorganic material such as $SiO_2$, $SiO_xN_y$, or $SiN_x$ and may be a layer or layers including the inorganic material.

A semiconductor pattern may be arranged on the buffer layer 311. Hereinafter, the semiconductor pattern, which is directly arranged on the buffer layer 311, is defined as a first semiconductor pattern. The first semiconductor pattern may include a silicon semiconductor. The first semiconductor pattern may include polysilicon. However, one or more embodiments are not limited thereto. The first semiconductor pattern may also include amorphous silicon.

FIG. 6 merely illustrates a portion of the first semiconductor pattern, but the first semiconductor pattern may be further arranged in another region of the pixel PX (see FIG. 4). The first semiconductor pattern may include a doping area and a non-doping area. The doping area may be doped with N-type dopants or P-type dopants. A P-type transistor (e.g., PMOS) may include a doping area doped with P-type dopants.

The first transistor T1 may include the source S1, an active A1, and the drain D1. The source S1, the active A1, and the drain D1 of the first transistor T1 may be formed as the first semiconductor pattern. The source S1 and the drain D1 of the first transistor T1 may be apart from each other with the active A1 of the first transistor T1 therebetween.

A connection signal line SCL may be further arranged on the buffer layer 311. The connection signal line SCL may be connected to the drain D6 of the sixth transistor T6 (see FIG. 4) on a plane. Alternatively, the connection signal line SCL may be omitted.

A first insulating layer 313 may be arranged on the buffer layer 311. The first insulating layer 313 may cover the first semiconductor pattern. In an embodiment, the first insulating layer 313 may include an inorganic material such as $SiO_2$, $SiO_xN_y$, or $SiN_x$ and may be a layer or layers including the inorganic material.

The gate G1 of the first transistor T1 may be arranged on the first insulating layer 313. The gate G1 of the first transistor T1 may be a portion of a metal pattern. The gate G1 of the first transistor T1 may at least partially overlap the first semiconductor pattern arranged thereunder. For example, the gate G1 may of the first transistor T1 overlap the active A1 arranged thereunder. The gate G1 of the first transistor T1 may include a low-resistance conductive materials such as molybdenum (Mo), aluminum (Al), copper (Cu), and/or titanium (Ti) and may be a layer or layers including the low-resistance conductive materials.

A second insulating layer 314 may be arranged on the first insulating layer 313. The second insulating layer 314 may cover the gate G1 of the first transistor T1 arranged on the first insulating layer 313. The second insulating layer 314 may include an inorganic material such as $SiO_2$, $SiO_xN_y$, or $SiN_x$ and may be a layer or layers including the inorganic material.

An upper electrode UE may be arranged on the second insulating layer 314. The upper electrode UE may at least partially overlap the gate G1 of the first transistor G1 arranged thereunder. The upper electrode UE may be a portion of a metal pattern or a portion of a doped semiconductor pattern. A portion of the gate G1 of the first transistor T1 and the upper electrode UE overlapping the portion may form the first storage capacitor Cst (see FIG. 4). Alternatively, the upper electrode UE may be omitted.

For example, the first electrode CE1 (see FIG. 4) and the second electrode CE2 (see FIG. 4) of the first storage capacitor Cst (see FIG. 4) may be respectively formed through the same processes as forming the gate G1 of the first transistor T1 and the upper electrode UE. The first electrode CE1 may be arranged on the first insulating layer 313 and may be electrically connected to the gate G1. The first electrode CE1 may be integrally formed with the gate G1.

A third insulating layer 315 may be arranged on the second insulating layer 314. The third insulating layer 315 may cover the upper electrode UE arranged on the second insulating layer 314. The third insulating layer 315 may include an inorganic material such as $SiO_2$, $SiO_xN_y$, or $SiN_x$ and may be a layer or layers including the inorganic material. In an embodiment, the third insulating layer 315 may include silicon oxide layers and silicon oxynitride layers that are alternately stacked.

For example, the sources S2, S5, S6, and S7 (see FIG. 4), the drains D2, D5, D6, and D7 (see FIG. 4), and the gates G2, G5, G6, and G7 (see FIG. 4) of the second, fifth, sixth, and seventh transistors T2, T5, T6, and T7 (see FIG. 4) may be respectively formed through the same processes as forming the source S1, the drain D1, and the gate G1 of the first transistor T1.

A semiconductor pattern may be arranged on the third insulating layer 315. Hereinafter, the semiconductor pattern, which is directly arranged on the third insulating layer 315, may be defined as a second semiconductor pattern. The second semiconductor pattern may include an oxide semiconductor. The oxide semiconductor may include a crystalline or amorphous oxide semiconductor.

For example, the oxide semiconductor may include at least one material selected from the group consisting of indium (In), gallium (Ga), stannum (Sn), zirconium (Zn), vanadium (V), hafnium (Hf), cadmium (Cd), germanium (Ge), chromium (Cr), Ti, and zinc (Zn). Alternatively, the oxide semiconductor may include indium tin oxide (ITO), indium gallium zinc oxide (IGZO), zinc oxide (ZnO), indium zinc oxide (IZnO), zinc indium oxide (ZIO), indium oxide (InO), titanium oxide (TiO), indium zinc tin oxide (IZTO), zinc tin oxide (ZTO), or the like.

The third transistor T3 may include the source S3, an active A3, and the drain D3. The source S3, the active A3, and the drain D3 of the third transistor T3 may be formed as the second semiconductor pattern. The source S3 and the drain D3 of the third transistor T3 may include metal reduced from a metal oxide semiconductor. The source S3 and the drain D3 of the third transistor T3 may have a certain thickness from an upper surface of the second semiconductor pattern and may include a metal layer including the reduced metal.

A fourth insulating layer 316 may be arranged on the third insulating layer 315. The fourth insulating layer 316 may cover the second semiconductor pattern arranged on the third insulating layer 315. In an embodiment, the fourth insulating layer 316 may include an inorganic material such as $SiO_2$, $SiO_xN_y$, or $SiN_x$ and may be a layer or layers including the inorganic material.

In an embodiment, the fourth insulating layer 316 may be patterned corresponding to the gate G3 of the third transistor T3 arranged on the fourth insulating layer 316. For example, the gate G3 of the third transistor T3 and the fourth insulating layer 316 may have the same shape on the plane.

The gate G3 of the third transistor T3 may be arranged on the fourth insulating layer 316. The gate G3 of the third transistor T3 may be a portion of the metal pattern. The gate G3 of the third transistor T3 may at least partially overlap the second semiconductor pattern arranged thereunder. For example, the gate G3 of the third transistor T3 may overlap the active A3 arranged thereunder. The gate G3 of the third transistor T3 may include a low-resistance conductive material such as Mo, Al, Cu, and/or Ti and may be a layer or layers including the low-resistance conductive material.

A fifth insulating layer 317 may be arranged on the fourth insulating layer 316. The fifth insulating layer 317 may cover the gate G3 arranged on the fourth insulating layer 316. In an embodiment, the fifth insulating layer 317 may include an inorganic material such as $SiO_2$, $SiO_xN_y$, or $SiN_x$ and may be a layer or layers including the inorganic material. In an embodiment, the fifth insulating layer 317 may include silicon oxide layers and silicon nitride layers that are alternately arranged.

For example, the source S4 (see FIG. 4), the drain D4 (see FIG. 4), and the gate G4 (see FIG. 4) of the fourth transistor T4 (see FIG. 4) may be formed through the same processes as forming the source S3, the drain D3, and the gate G3 of the third transistor T3.

The first to fifth insulating layers 313 to 317 may be collectively referred to as the inorganic insulating layers IL. However, at least one of the first to fifth insulating layers 313 to 317 may be omitted.

At least one organic insulating layer may be arranged on the fifth insulating layer 317. In an embodiment, a first organic insulating layer 318, a second organic insulating layer 319, and a third organic insulating layer 320 may be arranged on the fifth insulating layer 317. The first organic insulating layer 318, the second organic insulating layer 319, and the third organic insulating layer 320 may each be a polyimide-based resin layer. However, one or more embodiments are not limited thereto. The first organic insulating layer 318, the second organic insulating layer 319, and the third organic insulating layer 320 may each include at least one of acryl-based resin, methacryl-based resin, polyisoprene, vinyl-based resin, epoxy-based resin, urethane-based resin, cellulose-based resin, siloxane-based resin, polyamide-based resin, and perylene-based resin.

A first connection electrode CNE1 may be arranged on the fifth insulating layer 317. The first connection electrode CNE1 may be connected to the connection signal line SCL through a contact hole CNT defined in the first to fifth insulating layers 313 to 317.

A second connection electrode CNE2 may be arranged on the first organic insulating layer 318. The second connection electrode CNE2 may be connected to the first connection electrode CNE1 through a first via hole VIA1 defined in the first organic insulating layer 318.

The organic light-emitting diode OLED1 may be arranged on the third organic insulating layer 320. The organic light-emitting diode OLED1 may include a pixel electrode 331, an intermediate layer 332, and an opposite electrode 333. The pixel electrode 331 may be arranged on the third organic insulating layer 320. Also, the pixel-defining layer 323 may be arranged on the third organic insulating layer 320.

The pixel electrode 331 may be arranged on the third organic insulating layer 320. The pixel electrode 331 may be electrically connected to the second connection electrode CNE2 through a second via hole VIA2 defined in the second organic insulating layer 319 and the third organic insulating layer 320. The pixel electrode 331 may include conductive oxide such as ITO, IZO, ZnO, $In_2O_3$, IGO, or AZO. In an embodiment, the pixel electrode 331 may include a reflection layer including silver (Ag), magnesium (Mg), Al, platinum (Pt), palladium (Pd), gold (Au), nickel (Ni), neodymium (Nd), iridium (Ir), Cr, or a combination thereof. In an embodiment, the pixel electrode 331 may further include a layer including ITO, IZO, ZnO, or $In_2O_3$ on/under the reflection layer. For example, the pixel electrode 331 may have a multilayered structure of ITO/Ag/ITO.

The pixel-defining layer 323 including the first opening 323OP, through which at least a portion of the pixel electrode 331 is exposed, may be arranged on the pixel electrode 331. The first opening 323OP of the pixel-defining layer 323 may define an emission area EA of light emitted from the organic light-emitting diode OLED1. For example, a width of the first opening 323OP may correspond to a width of the emission area EA. A periphery of the emission area EA may be a non-emission area NEA, and the non-emission area NEA may surround the emission area EA.

The pixel-defining layer 323 may include an organic insulating material. Alternatively, the pixel-defining layer 323 may include an inorganic insulating material such as $SiN_X$, $SiO_XN_Y$, or $SiO_2$. Alternatively, the pixel-defining layer 323 may include an organic insulating material and an inorganic insulating material. In an embodiment, the pixel-defining layer 323 may include a light block material and may be black. The light block material may include carbon black, a carbon nanotube, resin or paste including a black dye, metal particles (e.g., Ni, Al, Mo, and an alloy thereof), metal oxide particles (e.g., chromium oxide), metal nitride particles (e.g., chromium nitride), or the like. When the pixel-defining layer 323 includes the light block material, external light reflection from metal structures arranged under the pixel-defining layer 323 may decrease.

For example, a spacer may be arranged on the pixel-defining layer 323. The spacer may include an organic insulating material such as polyimide. Alternatively, the spacer may include an inorganic insulating material such as $SiN_X$ or $SiO_2$ or an organic insulating material and an inorganic insulating material.

In an embodiment, the spacer may include the same material as the pixel-defining layer 323. In this case, the pixel-defining layer 323 and the spacer may be formed together in a mask process using a halftone mask. Alternatively, the spacer and the pixel-defining layer 323 may include different materials.

The intermediate layer 332 may be arranged on the pixel electrode 331. The intermediate layer 332 may include a first functional layer 332a, an emission layer 332b, and a second functional layer 332c that are sequentially stacked. The first functional layer 332a and the second functional layer 332c may be collectively referred to as organic functional layers 332e.

The emission layer 332b may be arranged in the first opening 323OP of the pixel-defining layer 323. The emission layer 332b may include a polymer or low-molecular weight organic material emitting a certain color of light.

The organic functional layer 332e may include at least one of the first functional layer 332a between the pixel electrode 331 and the emission layer 332b and the second functional layer 332c between the emission layer 332b and the opposite electrode 333. For example, the first functional layer 332a may be arranged between the pixel electrode 331 and the emission layer 332b, and the second functional layer 332c may be omitted between the emission layer 332b and the opposite electrode 333. In an embodiment, the first functional layer 332a may be omitted between the pixel electrode 331 and the emission layer 332b, and the second functional layer 332c may be arranged between the emission layer 332b and the opposite electrode 333. In an embodiment, the first functional layer 332a may be arranged between the pixel electrode 331 and the emission layer 332b, and the second functional layer 332c may be arranged between the emission layer 332b and the opposite electrode 333. Hereinafter, a case where the first functional layer 332a and the second functional layer 332c are arranged respectively will be described in detail.

The first functional layer 332a may include, for example, a Hole Transport Layer (HTL) or a HTL and a Hole Injection Layer (HIL). The second functional layer 332c may include an Electron Transport Layer (ETL) and/or an Electron Injection Layer (EIL). The first functional layer 332a and/or the second functional layer 332c may be common layers formed to entirely cover the substrate BS.

The opposite electrode 333 may include a conductive material having a low work function. For example, the opposite electrode 333 may include a transparent (e.g., translucent) layer including Ag, Mg, Al, Pt, Pd, Au, Ni, Nd, Ir, Cr, Li, Ca, or an alloy thereof. Alternatively, the opposite electrode 333 may further include a layer such as ITO, IZO, ZnO, or $In_2O_3$ on the transparent (e.g., translucent) layer including the above material.

For example, a capping layer may be further arranged on the opposite electrode 333. The capping layer may include LiF, an inorganic material, and/or an organic material.

An encapsulation member 340 may be arranged on the organic light-emitting diode OLED1. The encapsulation member 340 may include a thin film encapsulation layer. In an embodiment, it is illustrated that the encapsulation member 340 includes the thin film encapsulation layer, but one or more embodiments are not limited thereto. The encapsulation member 340 may include an encapsulation substrate.

The thin film encapsulation layer (included in the encapsulation member 340) may include at least one inorganic layer and at least one organic layer. For example, the thin film encapsulation layer (included in the encapsulation member 340) may include a first inorganic layer 341, an organic layer 342, and a second inorganic layer 343 that are sequentially stacked.

The first inorganic layer 341 may be arranged directly on the opposite electrode 333. The first inorganic layer 341 may prevent or reduce the penetration of external moisture or oxygen into the organic light-emitting diode OLED1.

The organic layer 342 may be arranged directly on the first inorganic layer 341. The organic layer 342 may provide a flat surface on the first inorganic layer 341. Curves or particles formed on an upper surface of the first inorganic layer 341 may be covered by the organic layer 342, and thus, a surface state of the upper surface of the first inorganic layer 341 may not affect elements formed on the organic layer 342.

The second inorganic layer 343 may be arranged directly on the organic layer 342. The second inorganic layer 343 may prevent or reduce the discharge of moisture, etc. from the organic layer 342 to the outside.

The first inorganic layer 341 may include one or more of aluminum oxide ($Al_2O_3$), titanium oxide ($TiO_2$), tantalum oxide ($Ta_2O_5$), hafnium oxide ($HfO_2$), ZnO, $SiO_2$, $SiN_X$, and $SiO_XN_Y$. The first inorganic layer 341 and the second inorganic layer 343 may each be a layer or layers including the above material. The organic layer 342 may include a polymer-based material. The polymer-based material may include acryl-based resin, epoxy-based resin, polyimide, and polyethylene. In an embodiment, the organic layer 342 may include acrylate.

The input sensor 350 (e.g., the input sensor ISS of FIG. 2B) may be arranged on the encapsulation member 340. The input sensor 350 may include first and second conductive patterns 352 and 354, a first detection insulating layer 351, a second detection insulating layer 353, and a third detection insulating layer 355.

The first detection insulating layer 351 may be arranged on the encapsulation member 340. Also, the first conductive patterns 352 may be arranged on the first detection insulating layer 351 and covered by the second detection insulating layer 353. Also, the second conductive patterns 354 may be arranged on the second detection insulating layer 353 and covered by the third detection insulating layer 355. The first detection insulating layer 351, the second detection insulating layer 353, and the third detection insulating layer 355 may each include at least one of an inorganic material and an organic material.

The first and second conductive patterns 352 and 354 may each have conductivity. Each of the first and second conductive patterns 352 and 354 may be a layer or layers. Also, at least one of the first and second conductive patterns 352 and 354 may be mesh lines on a plane.

The mesh lines forming the first and second conductive patterns 352 and 354 may not overlap the emission layer 332b on a plane. Therefore, although the input sensor 350 is directly formed on the display panel DP (see FIG. 2B), light generated by the pixels PX of the display panel DP may be provided to a user without interference from the input sensor 350.

When the black matrix 360 is directly formed on the second conductive pattern 354, the second conductive pattern 354 may be damaged during a process of patterning the black matrix 360. Therefore, as the third detection insulating layer 355 is arranged between the second conductive pattern 354 and the black matrix 360, the damage to the second conductive pattern 354 may be prevented or reduced during the process of patterning the black matrix 360.

The color filter 370 may be arranged on the input sensor 350. The color filter 370 may at least partially overlap the emission layer 332b arranged thereunder. The color filter 370 may selectively transmit light corresponding to light provided from the emission layer 332b. For example, when the emission layer 332b provides blue light, the color filter 370 may be a blue color filter transmitting the blue light. Alternatively, when the emission layer 332b provides green light, the color filter 370 may be a green color filter transmitting the green light. Alternatively, when the emission layer 332b provides red light, the color filter 370 may be a red color filter transmitting the red light.

The color filter 370 may include polymer photosensitive resin, a pigment, or a dye. For example, the color filter 370, which overlaps the emission layer 332b providing blue light, includes a blue pigment or dye, the color filter 370, which overlaps the emission layer 332b providing green light, includes a green pigment or dye, and the color filter 370, which overlaps the emission layer 332b providing red light, includes a red pigment or dye.

However, one or more embodiments are not limited thereto. The color filter 370, which overlaps the emission layer 332b providing the blue light, may not include a pigment or a dye. In this case, the color filter 370 may be transparent and may include transparent photosensitive resin.

The black matrix 360 may be arranged between the color filters 370 providing different lights. The black matrix 360 may be a black pattern and a matrix having a lattice. The black matrix 360 may include a black coloring agent. The black coloring agent may include a black dye and a black pigment. The black coloring agent may include carbon black, metal (e.g., Cr), or oxide thereof. In an embodiment, the black matrix 360 may include the same material as the pixel-defining layer 323.

In an embodiment, the black matrix 360 may include the second opening 360OP overlapping the emission area EA of the organic light-emitting diode OLED1. A width of the second opening 360OP of the black matrix 360 may be identical to or greater than the width of the emission area EA of the organic light-emitting diode OLED1 and/or the first opening 323OP of the pixel-defining layer 323. However, one or more embodiments are not limited thereto. In an embodiment, the color filters 370 may be located (or arranged) in the second opening 360OP defined in the black matrix 360.

The overcoat layer 380 may be arranged on the color filter 370 and the black matrix 360. The overcoat layer 380 may be a light-transmitting layer that does not have a color in a visible light band and may provide an upper surface that is flat and surrounds uneven portions generated during a process of forming the color filters 370 and the black matrix 360. For example, the overcoat layer 380 may include a light-transmitting organic material such as acryl-based resin.

Referring to FIGS. 5, 6, and 7, in an embodiment, the electronic device 1000 (of FIG. 2A) may include the display apparatus DA, and the display apparatus DA may include the substrate BS, the buffer layer 311, the inorganic insulating layers IL, an organic light-emitting diode OLED2, the encapsulation member 340, the input sensor 350 (e.g., corresponding to the input sensor ISS of FIG. 2B), the black matrix 360, the color filters 370, and the overcoat layer 380.

The substrate BS may have a structure in which a layer including an organic material and a layer including an inorganic material are alternately stacked. For example, the substrate BS may include the first base layer 301, the first barrier layer 302, the second base layer 303, and the second barrier layer 304 that are sequentially stacked.

The buffer layer 311 may be arranged on the substrate BS. The buffer layer 311 may be arranged in the display area BA as well as the transmission area BT.

The light blocking layer BML may be arranged between the substrate BS and the buffer layer 311. For example, the light blocking layer BML may be arranged in the display area BA of the first area A1. For example, the light blocking layer BML may overlap the display area BA of the first area A1 and may not overlap the transmission area BT of the first area A1. In an embodiment, when the second barrier layer 304 is omitted, the light blocking layer BML may be arranged between the second base layer 303 and the buffer layer 311.

In an embodiment, the light blocking layer BML may include the first hole BML-H corresponding to the transmission area BT. For example, the shape and/or the size of the transmission area BT may be defined by the first hole BML-H defined in the light blocking layer BML.

In an embodiment, the light blocking layer BML may prevent or reduce the influence of light, which propagates towards the electronic module SS (see FIG. 2A) overlapping the first area A1 or is emitted from the electronic module SS, on components such as transistors. Also, the light blocking layer BML may prevent or reduce the possibility of seeing conductive materials on the substrate BS on the electronic module SS, which is caused by external light. Therefore, although the electronic module SS is arranged in the active area AA (see FIG. 2A), the electronic device 1000 (see FIG. 2A) including the electronic module SS having the improved performance may be implemented.

In an embodiment, the light blocking layer BML may include a first light blocking layer, a second light blocking layer, and a third light blocking layer that are sequentially stacked. The first to third light blocking layers may include different materials. For example, the first light blocking layer may include amorphous silicon, the second light blocking layer may include $SiO_2$, and the third light blocking layer may include metal, for example, Al, Pt, Pd, Ag, Mg, Au, Ni, Nd, Ir, Cr, Ni, Ca, Mo, Ti, tungsten (W), and/or copper (Cu), which has conductivity.

External light reflected from the electronic module SS may be reflected from the light blocking layer BML and may be incident to the electronic module SS again, and thus, a ghost problem may occur. In an embodiment, because the light blocking layer BML includes the first light blocking layer, the second light blocking layer, and the third light blocking layer, the external light reflected from the electronic module SS may destructively interfere in the light blocking layer BML, and thus the occurrence of the ghost problem may be prevented or reduced.

In an embodiment, the transmission area BT may be formed as insulating layers overlapping the transmission area BT among the first to fifth insulating layers 313 to 317 are omitted. For example, at least one of the first to fifth insulating layers 313 to 317 may include a hole corresponding to the transmission area BT.

In an embodiment, when the first to fifth insulating layers 313 to 317 are collectively referred to as the inorganic insulating layers IL, the inorganic insulating layers IL may include a second hole IL-H corresponding to the transmission area BT. As the inorganic insulating layers IL include the second hole IL-H corresponding to the transmission area BT, the transmittance of the transmission area BT may be improved.

In the display area BA of the first area A1, the first organic insulating layer 318, the second organic insulating layer 319, the third organic insulating layer 320, and the pixel-defining layer 323 may be sequentially arranged. The second organic insulating layer 319, the third organic insulating layer 320, and the pixel-defining layer 323 may respectively include a third hole 319H, a fourth hole 320H, and a fifth hole 323H that correspond to the transmission area BT.

At least one of the second organic insulating layer 319, the third organic insulating layer 320, and the pixel-defining layer 323, which are arranged on the first organic insulating layer 318, may flow towards the transmission area BT due to a step difference between the display area BA and the transmission area BT, when the first organic insulating layer 318 includes a hole corresponding to the transmission area BT. For example, the pixel-defining layer 323 arranged in the display area BA may flow towards the transmission area BT.

In an embodiment, the first organic insulating layer 318 may not include a hole corresponding to the transmission area BT. For example, the first organic insulating layer 318 may be arranged in the display area BA as well as the transmission area BT. As the first organic insulating layer 318 is arranged in the display area BA as well as the transmission area BT, the flow of at least one of the second organic insulating layer 319, the third organic insulating layer 320, and the pixel-defining layer 323, which are arranged on the first organic insulating layer 318, towards the transmission area BT may be prevented or reduced.

Also, as the third hole 319H, the fourth hole 320H, and the fifth hole 323H corresponding to the transmission area BT are respectively defined in the second organic insulating layer 319, the third organic insulating layer 320, and the pixel-defining layer 323, the transmittance of the transmission area BT may be improved.

The first connection electrode CNE1 may be arranged on the fifth insulating layer 317, and the second connection electrode CNE2 may be arranged on the first organic insulating layer 318. Also, the organic light-emitting diode OLED2 including the pixel electrode 331, the intermediate layer 332, and the opposite electrode 333 may be arranged on the pixel-defining layer 323.

In an embodiment, the second connection electrode CNE2 may be electrically connected to the first connection electrode CNE1 through the via hole VIA1 defined in the first organic insulating layer 318, and the pixel electrode 331 may be electrically connected to the second connection electrode CNE2 through the second via hole VIA2 defined in the second organic insulating layer 319 and the third organic insulating layer 320.

FIG. 7 illustrates that the first connection electrode CNE1 and the second connection electrode CNE2 overlap the first transistor T1 for descriptive convenience, but one or more embodiments are not limited thereto. Also, FIG. 7 illustrates that the first connection electrode CNE1 is arranged between the first transistor T1 and the third transistor T3 for descriptive convenience, but one or more embodiments are not limited thereto.

In an embodiment, an organic functional layer 322e may include the first functional layer 332a and the second functional layer 332c, and the first functional layer 332a and the second functional layer 332c may be arranged in the display area BA as well as the transmission area BT.

In an embodiment, the opposite electrode 333 may be arranged in the display area BA of the first area A1. The arrangement will be described below with reference to FIG. 8.

The encapsulation member 340, the input sensor 350, the black matrix 360, the color filters 370, and the overcoat layer 380 may be sequentially arranged on the organic light-emitting diode OLED2.

The encapsulation member 340 may be included as the thin film encapsulation layer, and the thin film encapsulation layer may include the first inorganic layer 341, the organic layer 342, and the second inorganic layer 343 that are sequentially stacked. The first inorganic layer 341, the organic layer 342, and the second inorganic layer 343 may be arranged in the display area BA as well as the transmission area BT.

The input sensor 350 may include the first and second conductive patterns 352 and 354, the first detection insulating layer 351, the second detection insulating layer 353, and the third detection insulating layer 355. The first detection insulating layer 351, the second detection insulating layer 353, and the third detection insulating layer 355 may be arranged in the display area BA as well as the transmission area BT.

The black matrix 360 including the second opening 360OP corresponding to the emission layer 332b may be arranged on the input sensor 350, and the color filters 370 may be arranged in the second opening 360OP defined in the black matrix 360. The color filters 370 may be arranged on the upper surface of the black matrix 360. The black matrix 360 may be arranged in the display area BA and may include a seventh hole 360H corresponding to the transmission area BT. As the seventh hole 360H corresponding to the transmission area BT is defined in the black matrix 360, the transmittance of the transmission area BT may be improved.

The overcoat layer 380 may be arranged on the color filter 370 and the black matrix 360. The overcoat layer 380 may be arranged in the display area BA as well as the transmission area BT.

In an embodiment, first and second protective patterns PTL1 and PTL2 may be further arranged on the substrate BS. The first and second protective patterns PTL1 and PTL2 may be arranged in the display area BA adjacent to the transmission area BT. The first and second protective patterns PTL1 and PTL2 may be arranged in the display area BA and along a periphery of the transmission area BT.

The first protective pattern PTL1 may be arranged on the fifth insulating layer 317. The first protective pattern PTL1 may overlap the first organic insulating layer 318 and the second organic insulating layer 319 arranged thereon. However, one or more embodiments are not limited thereto. The first protective pattern PTL1 may also be arranged between the inorganic insulating layers IL.

The second protective pattern PTL2 may be arranged on the first organic insulating layer 318. The second protective pattern PTL2 may overlap the pixel-defining layer 323 arranged thereon. However, one or more embodiments are not limited thereto. The second protective pattern PTL2 may be arranged on the second organic insulating layer 319.

Because the first and second protective patterns PTL1 and PTL2 are arranged in the display area BA adjacent to the transmission area BT, the separation of components arranged in the display area BA adjacent to the transmission area BT may be prevented or reduced, the separation occurring during a process of removing the opposite electrode 333 formed in the transmission area BT using laser beams. Therefore, the reliability of the display apparatus may be improved. For example, the first and second protective patterns PTL1 and PTL2 may include a laser shielding layer for protecting the components arranged in the display area BA from the laser beams.

In an embodiment, a valley portion VP may be further included in the display apparatus DA. The valley portion VP may be formed in the first organic insulating layer 318 arranged in the display area BA. The valley portion VP will be described in more detail with reference to FIG. 8.

Figure 8:
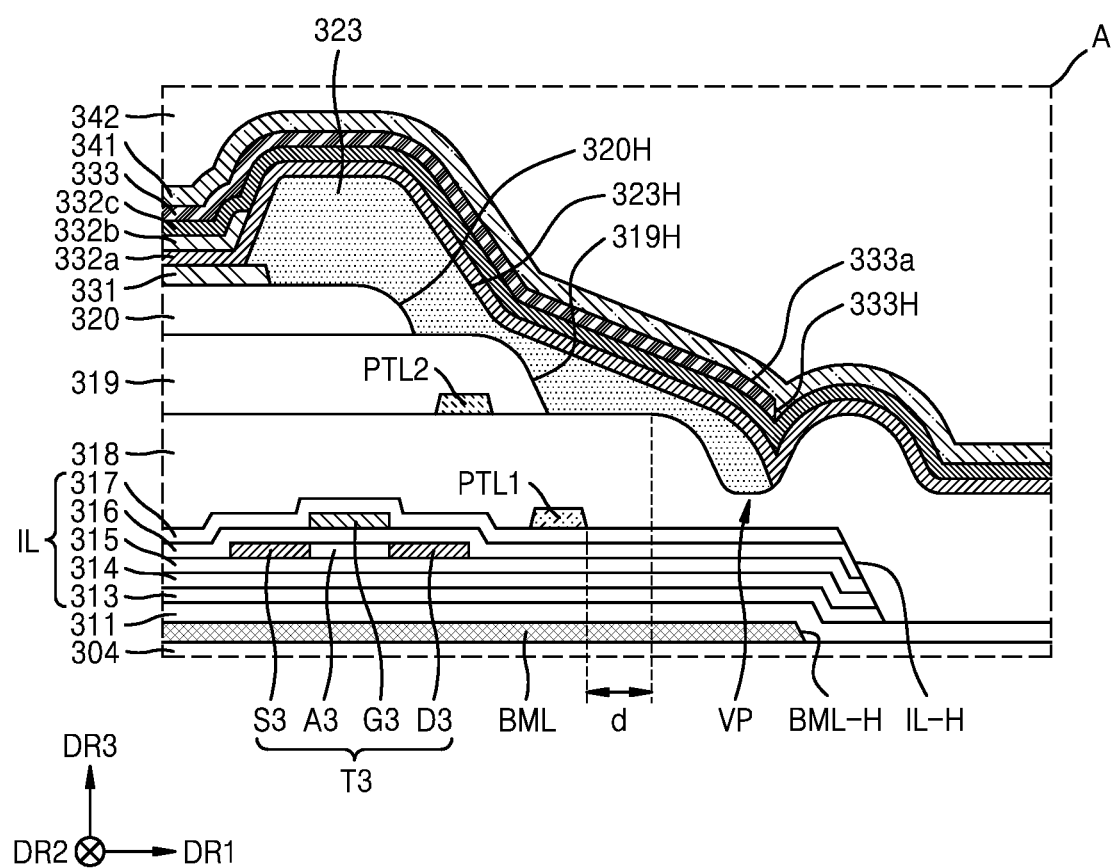
FIG. 8 is a cross-sectional view of an embodiment of a portion A of FIG. 7 illustrating the active area in the electronic device.

FIG. 8 is a cross-sectional view of an active area included in an electronic device according to an embodiment. In detail, FIG. 8 is an enlarged diagram of a portion A of FIG. 7.

Referring to FIGS. 5 to 8, the valley portion VP may be formed (or defined) in the first organic insulating layer 318 arranged in the display area BA. The valley portion VP may surround a periphery of the display area BA and may be arranged in the display area BA adjacent to the transmission area BT. Alternatively, the valley portion VP may be in the display area BA and arranged along a periphery of the transmission area BT. The valley portion VP may be arranged on outer sides of the first and second protective patterns PTL1 and PTL2. In an embodiment, the valley portion VP may be defined in the first organic insulating layer 318 by using a halftone mask without using an addition of a separate mask and/or a process.

In an embodiment, the valley portion VP may be arranged between a protective pattern (e.g., the first protective pattern PTL1) and an edge portion of the light blocking layer BML in a plan view (e.g., as viewed in the third direction DR3). For example, the edge portion of the light blocking layer BML may define the first hole BML-H of the light blocking layer BML. For example, the valley portion VP may extend along the edge portion of the light blocking layer BML. A distance d between the first protective pattern PTL1 and the valley portion VP may be equal to or greater than about 1 gm. In detail, a distance d between an end portion of the first protective pattern PTL1, which is close to the transmission area BT, and an end portion of the valley portion VP, which is close to the first protective pattern PTL1, may be equal to or greater than about 1 μm. When the distance d between the first protective pattern PTL1 and the valley portion VP is less than about 1 μm, the distance d between the first protective pattern PTL1 and the valley portion VP is too short, and thus, a portion of the first protective pattern PTL1 may be exposed when the valley portion VP is formed.

The valley portion VP may effectively control the pixel-defining layer 323 in the display area BA to flow towards the transmission area BT. In detail, the first organic insulating layer 318 may be arranged in the display area BA and the transmission area BT, and the second and third organic insulating layers 319 and 320 and the pixel-defining layer 323 may be arranged in the display area BA but not in the transmission area BT. For example, the second and third organic insulating layers 319 and 320 and the pixel-defining layer 323 may respectively include the third hole 319H, the fourth hole 320H, and the fifth hole 323H that correspond to the transmission area BT. In this case, when the second and third organic insulating layers 319 and 320 and the pixel-defining layer 323 are not arranged in the transmission area BT but are arranged in the display area BA, a step difference may be formed between the display area BA and the transmission area BT, and thus, portions of the second and third organic insulating layers 319 and 320 and the pixel-defining layer 323 may flow towards the transmission area BT from the display area BA. Therefore, the transmittance of the transmission area BT may be degraded. In particular, the pixel-defining layer 323 may include a light block material, and when the pixel-defining layer 323 including the light block material flows towards the transmission area BT, the transmittance of the transmission area BT may be degraded, and thus, the performance of the electronic module SS, which is arranged under the first area A1, may be degraded.

In an embodiment, as the valley portion VP is included in the display area BA adjacent to the transmission area BT, the flow of the portions of the second and third organic insulating layers 319 and 320 and the pixel-defining layer 323 towards the transmission area BT from the display area BA may be prevented or reduced.

In this case, at least a portion of the pixel-defining layer 323 may be arranged in the valley portion VP. For example, at least a portion of the pixel-defining layer 323 may fill the valley portion VP. As at least a portion of the pixel-defining layer 323 is arranged (or filled) in the valley portion VP, a step difference, which is formed by the valley portion VP, may be compensated for. Also, the pixel-defining layer 323 may cover a side surface of the second organic insulating layer 319 and a side surface of the third organic insulating layer 320.

In an embodiment, the opposite electrode 333 may be arranged in the display area BA, but not in the transmission area BT. For example, the opposite electrode 333 may be arranged only in the display area BA. The opposite electrode 333 may include a sixth hole 333H corresponding to the transmission area BT. As the sixth hole 333H corresponding to the transmission area BT is defined in the opposite electrode 333, the transmittance of the transmission area BT may be improved.

After the opposite electrode 333 is formed entirely in the display area BA and the transmission area BT, the opposite electrode 333, which is formed in the transmission area BT, may be removed by laser irradiation onto a rear surface of the substrate 100. In this case, the light blocking layer BML arranged in the display area BA may function as a mask. Burrs may be formed at an end portion 333a of the opposite electrode 333 in a process of removing the opposite electrode 333 formed in the transmission area BT. For example, the end portion 333a of the opposite electrode 333 may be rolled over in the process of removing the opposite electrode 333. In detail, light emitted from the laser may be partially diffracted, and the diffracted light may reach the opposite electrode 333 in the display area BA. Thus, a portion of the opposite electrode 333 may be removed, and the burr problem may be occurred because the end portion 333a of the opposite electrode 333 is rolled over. Also, cracks may occur in the first inorganic layer 341 and/or the second inorganic layer 343 formed on the opposite electrode 333 due to the burrs generated on the opposite electrode 333, and thus, the reliability of the display apparatus DA and the electronic device 1000 including the display apparatus DA may be degraded.

In an embodiment, as the valley portion VP is formed in the display area BA along the periphery of the transmission area BT and the pixel-defining layer 323 fills the valley portion VP, the occurrence of the burrs, which are generated when the pixel-defining layer 323 absorbs the light from the laser and/or the diffracted light and the end portion 333a of the opposite electrode 333 is rolled over, may be prevented or reduced. In detail, the valley portion VP is formed in the display area BA along the periphery of the transmission area BT, and the pixel-defining layer 323 may fill the valley portion VP. Because the opposite electrode 333 is arranged on the pixel-defining layer 323 filling the valley portion VP, the pixel-defining layer 323 may absorb the light emitted from the laser and/or the diffracted light to prevent the light and/or the diffracted light from reaching the opposite electrode 333. To this end, the occurrence of the burrs, which are generated when are generated when the end portion 333a of the opposite electrode 333 is rolled over, may be prevented or reduced.

Figure 9:
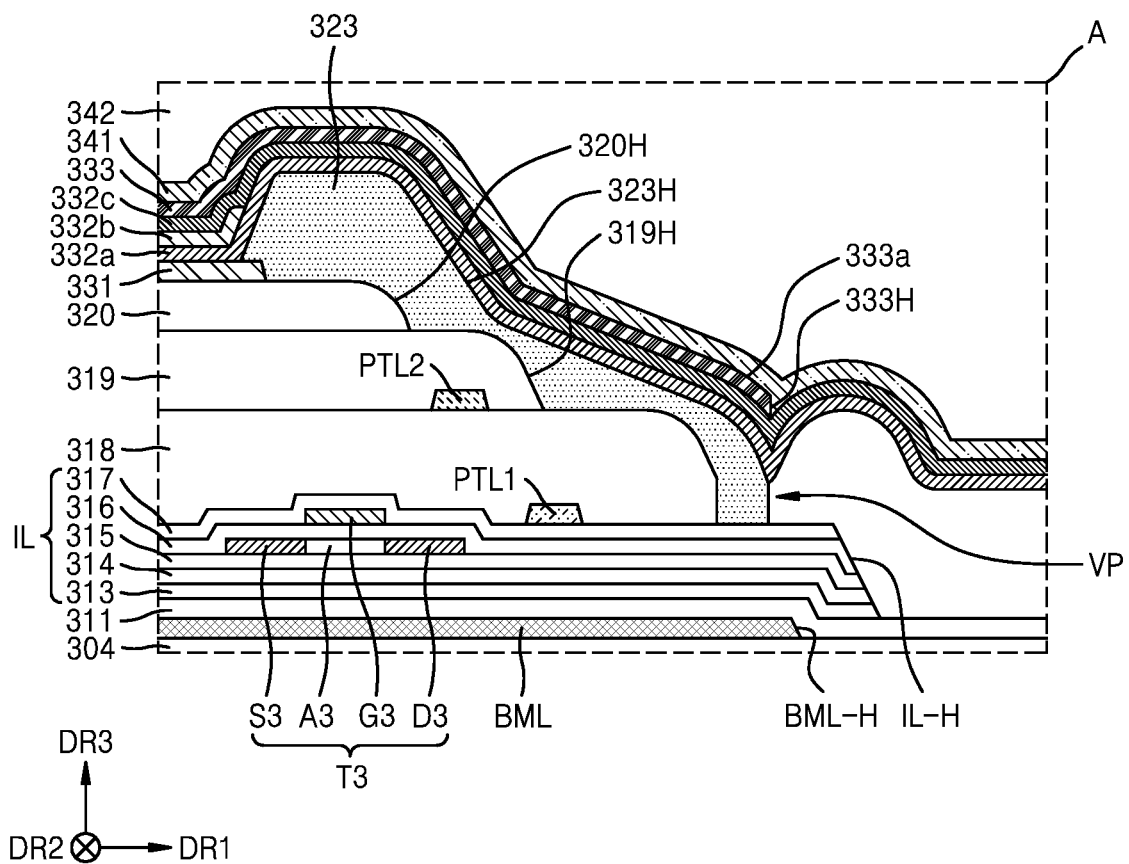
FIG. 9 is a cross-sectional view of another embodiment of the portion A of FIG. 7 illustrating the active area in the electronic device.

FIG. 9 is a cross-sectional view of an active area included in an electronic device according to an embodiment. The embodiment of FIG. 9 is different from the embodiment of FIG. 8 in that the valley portion VP exposes at least a portion of an upper surface of an insulating layer arranged under the valley portion VP. The same reference symbols in FIGS. 8 and 9 denote the same elements, and thus, their descriptions will not be repeated for descriptive convenience.

Referring to FIG. 9, the valley portion VP may be formed (or defined) in the first organic insulating layer 318 arranged in the display area BA. The valley portion VP may surround the periphery of the display area BA and may be arranged in the display area BA adjacent to the transmission area BT. In another expression, alternatively, the valley portion VP may be arranged in the display area BA and along the periphery of the transmission area BT.

In an embodiment, the valley portion VP may expose at least a portion of the upper surface of the insulating layer IL arranged under the valley portion VP. In detail, the valley portion VP may expose at least a portion of an upper surface of the fifth insulating layer 317 arranged thereunder. In this case, the valley portion VP may be defined by removing a portion of the first organic insulating layer 318 formed in the display area BA. For example, the valley portion VP may be defined by removing the first organic insulating layer 318 corresponding to the valley portion VP after the first organic insulating layer 318 is formed on the fifth insulating layer 317.

Figure 10:
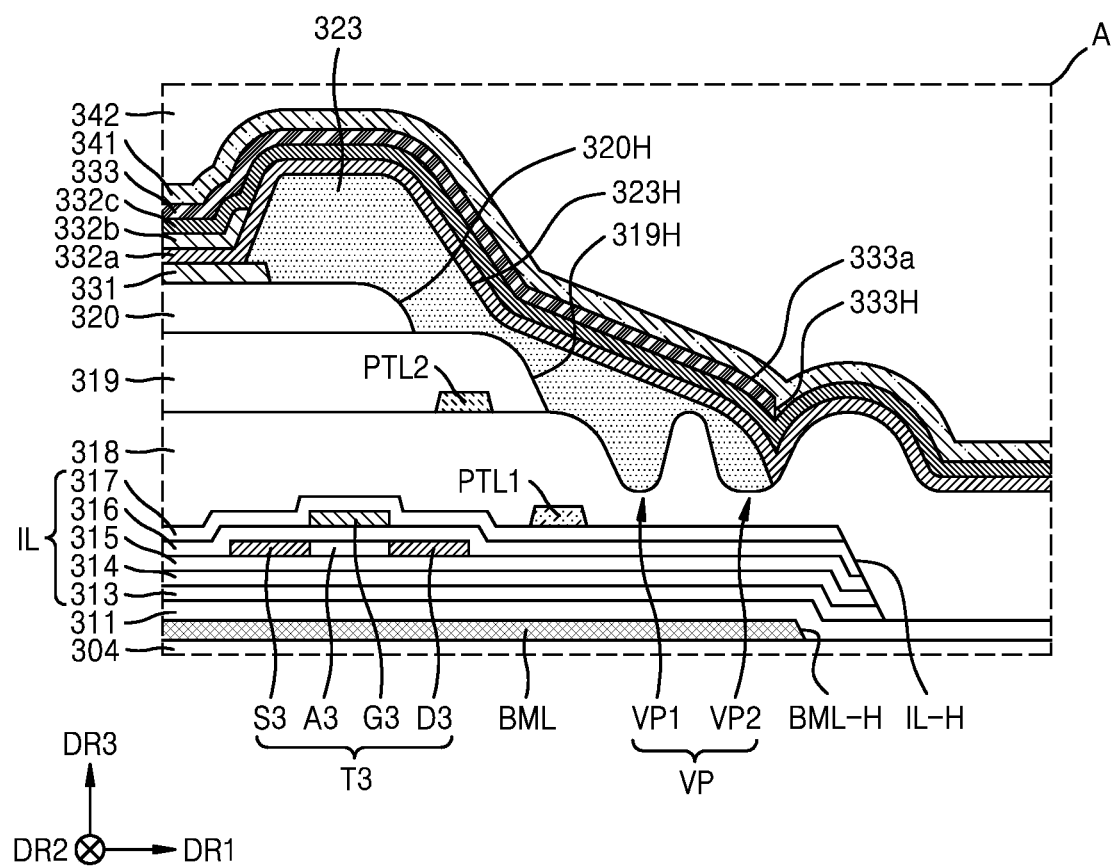
FIG. 10 is a cross-sectional view of still another embodiment of the portion A of FIG. 7 illustrating the active area in the electronic device.

FIG. 10 is a cross-sectional view of an active area included in an electronic device according to an embodiment. The embodiment of FIG. 10 is different from the embodiment of FIG. 8 in that the valley portion VP includes a first valley portion VP1 and a second valley portion VP2. The same reference symbols in FIGS. 8 and 10 denote the same elements, and thus, their descriptions will not be repeated for descriptive convenience.

Referring to FIG. 10, the valley portion VP may be formed (or defined) in the first organic insulating layer 318 arranged in the display area BA. The valley portion VP may surround the periphery of the display area BA and may be arranged in the display area BA adjacent to the transmission area BT. Alternatively, in another expression, the valley portion VP may be arranged in the display area BA and along the periphery of the transmission area BT.

In an embodiment, the valley portion VP may be provided in plural. For example, the valley portions VP may include the first valley portion VP1 and the second valley portion VP2. However, one or more embodiments are not limited thereto. The number of valley portions VP may vary and may be, for example, three or four.

As two valley portions VP are included in the display area BA adjacent to the transmission area BT, the flow of the pixel-defining layer 323 arranged in the display area BA towards the transmission area BT may be effectively controlled.

Figure 11:
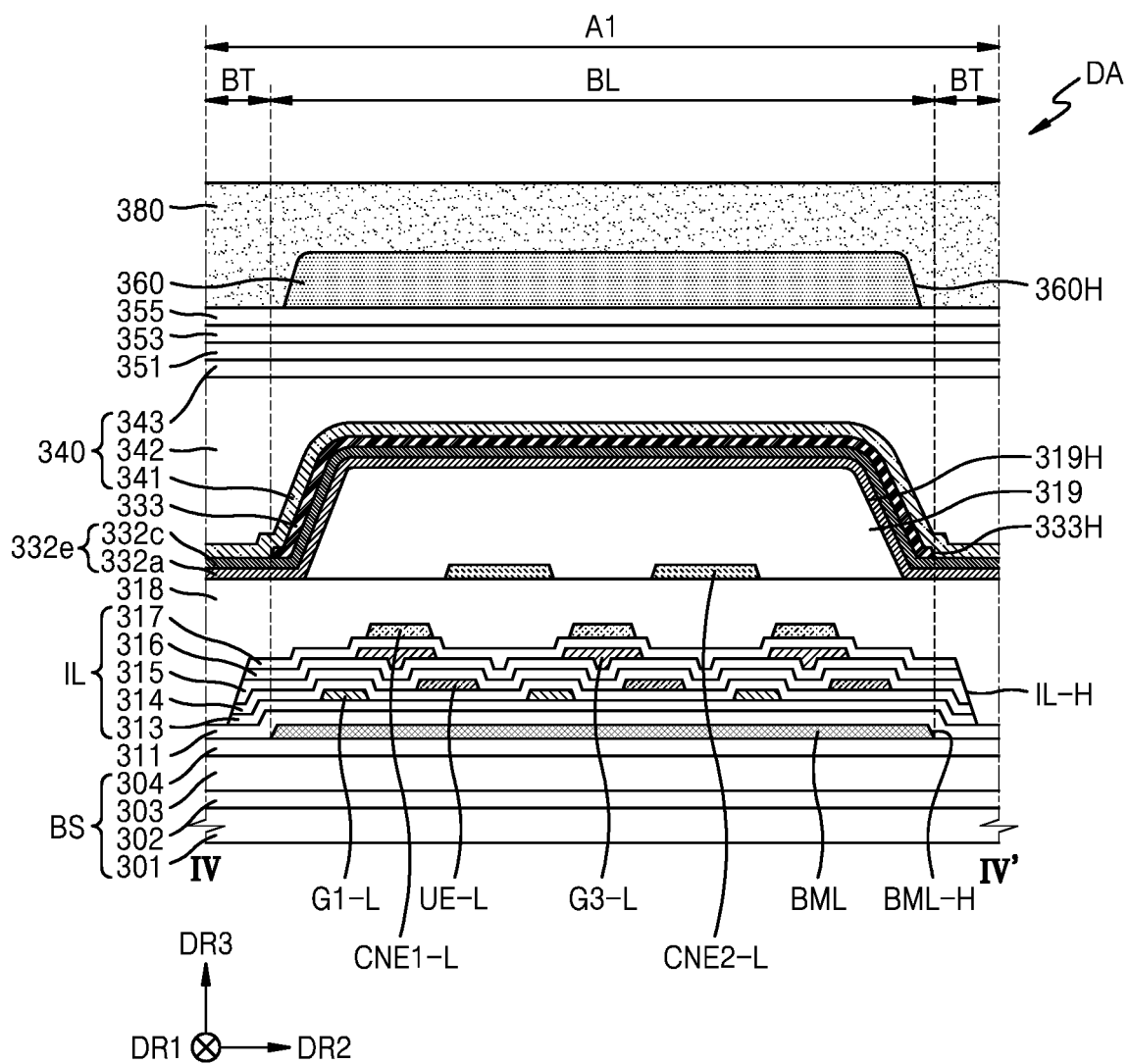
FIG. 11 is a cross-sectional view taken along lines IV-IV' of FIG. 5 illustrating an embodiment of the active area in the electronic device.

FIG. 11 is a cross-sectional view of an active area included in the electronic device 1000 or 2000 according to an embodiment. FIG. 11 is a cross-sectional view of the first area A1, taken along a line IV-IV' of FIG. 5.

Referring to FIGS. 5, 7, and 11, the light blocking layer BML, a first gate line G1-L, an upper electrode line UE-L, a third gate line G3-L, a first connection electrode line CNE1-L, and a second connection electrode line CNE2-L may be arranged in the wire area BL between the transmission areas BT. The transmission areas BT, which are adjacent to the wire area BL, may have the same layer structure as the transmission area BT adjacent to the display area BA which is described with reference to FIG. 7.

The substrate BS may have a structure in which a layer including an organic material and a layer including an inorganic material are alternatively stacked. For example, the substrate BS may include the first base layer 301, the first barrier layer 302, the second base layer 303, and the second barrier layer 304 that are sequentially stacked.

The light blocking layer BML may be arranged on the substrate BS. The light blocking layer BML arranged in the wire area BL may have the structure described with reference to FIG. 7. The buffer layer 311 may be arranged on the light blocking layer BML, and the first insulating layer 313 may be arranged on the buffer layer 311.

The first gate line G1-L may be arranged on the first insulating layer 313. The first gate line G1-L may be arranged at the same level and may include the same material as the gate G1 described above.

The second insulating layer 314 may be arranged on the first insulating layer 313, and the upper electrode line UE-L may be arranged on the second insulating layer 314. The upper electrode line UE-L may be arranged at the same level and may include the same material as the upper electrode UE described above. In an embodiment, the first gate line G1-L and the upper electrode line UE-L may be apart from each other on the cross-sectional view.

The third insulating layer 315 may be arranged on the second insulating layer 314, the fourth insulating layer 316 may be arranged on the third insulating layer 315, and the third gate line G3-L may be arranged on the fourth insulating layer 316. The third gate line G3-L may be arranged at the same level and may include the same material as the gate G3 described above. In an embodiment, the third gate line G3-L may at least partially overlap each of the first gate line G1-L and the upper electrode line UE-L on the cross-sectional view.

The fifth insulating layer 317 may be arranged on the fourth insulating layer 316, and the first connection electrode line CNE1-L may be arranged on the fifth insulating layer 317. The first connection electrode line CNE1-L may be arranged at the same level and may include the same material as the first connection electrode CNE1 described above. In an embodiment, the first connection electrode line CNE1-L may at least partially overlap the third gate line G3-L.

The first organic insulating layer 318 may be arranged on the fifth insulating layer 317, and the second organic insulating layer 319 may be arranged on the first organic insulating layer 318. The second connection electrode line CNE2-L may be arranged between the first organic insulating layer 318 and the second organic insulating layer 319. The second connection electrode line CNE2-L may be arranged at the same level and may include the same material as the second connection electrode CNE2 described above.

In an embodiment, portions of the first gate line G1-L, the upper electrode line UE-L, the third gate line G3-L, the first connection electrode line CNE1-L, and the second connection electrode line CNE2-L overlap each other, and thus, the size (e.g., area) of the wire area BL may decrease, and the size (e.g., area) of the transmission area BT may increase at the same time. Accordingly, the transmittance of the first area A1 including the transmission area BT may be improved.

Also, the first gate line G1-L, the upper electrode line UE-L, the third gate line G3-L, the first connection electrode line CNE1-L, and the second connection electrode line CNE2-L may completely overlap the light blocking layer BML arranged on the substrate BS.

In an embodiment, the third organic insulating layer 320 may be arranged on the second organic insulating layer 319. Also, for example, the third organic insulating layer 320 and the pixel-defining layer 323 may be arranged on the second organic insulating layer 319.

In an embodiment, the organic functional layer 332e including the first functional layer 332a and the second functional layer 332c may be arranged on the second organic insulating layer 319, the opposite electrode 333 may be arranged on the organic functional layer 332e, and the first inorganic layer 341, the organic layer 342, the second inorganic layer 343, the first detection insulating layer 351, the second detection insulating layer 353, and the third detection insulating layer 355 may be sequentially arranged on the opposite electrode 333. However, one or more embodiments are not limited thereto.

When the pixel-defining layer 323 is arranged on the first gate line G1-L, the upper electrode line UE-L, the third gate line G3-L, the first connection electrode line CNE1-L, and the second connection electrode line CNE2-L in the wire area BL, a portion of the pixel-defining layer 323, which is arranged in the wire area BL, flows towards the transmission area BT sometimes due to the step difference between the wire area BL and the transmission area BT.

In an embodiment, instead of the pixel-defining layer 323, the black matrix 360 may be arranged on the first gate line G1-L, the upper electrode line UE-L, the third gate line G3-L, the first connection electrode line CNE1-L, and the second connection electrode line CNE2-L in the wire area BL. Therefore, the pixel-defining layer 323 may be isolated in the first area A1. For example, the pixel-defining layer 323 may be disposed in the first area A1 to have an island pattern in a plan view. For example, the pixel-defining layer 323 may be arranged only in the display area BA of the first area A1.

In an embodiment, the black matrix 360 may be arranged on the third detection insulating layer 355. In an embodiment, the black matrix 360 may at least partially overlap the first gate line G1-L, the upper electrode line UE-L, the third gate line G3-L, the first connection electrode line CNE1-L, and the second connection electrode line CNE2-L arranged thereunder. For example, the black matrix 360 may completely overlap the first gate line G1-L, the upper electrode line UE-L, the third gate line G3-L, the first connection electrode line CNE1-L, and the second connection electrode line CNE2-L arranged thereunder.

As the black matrix 360 overlaps the first gate line G1-L, the upper electrode line UE-L, the third gate line G3-L, the first connection electrode line CNE1-L, and the second connection electrode line CNE2-L arranged thereunder, the reflection of the external light may be prevented, and the contrast of the display apparatus DA may be improved.

In an embodiment, holes BML-H, IL-H, 319H, and 360H, which correspond to the transmission area BT, may be defined in the light blocking layer BML, the inorganic insulating layers IL, the second organic insulating layer 319, and the black matrix 360, respectively.

Figure 12:
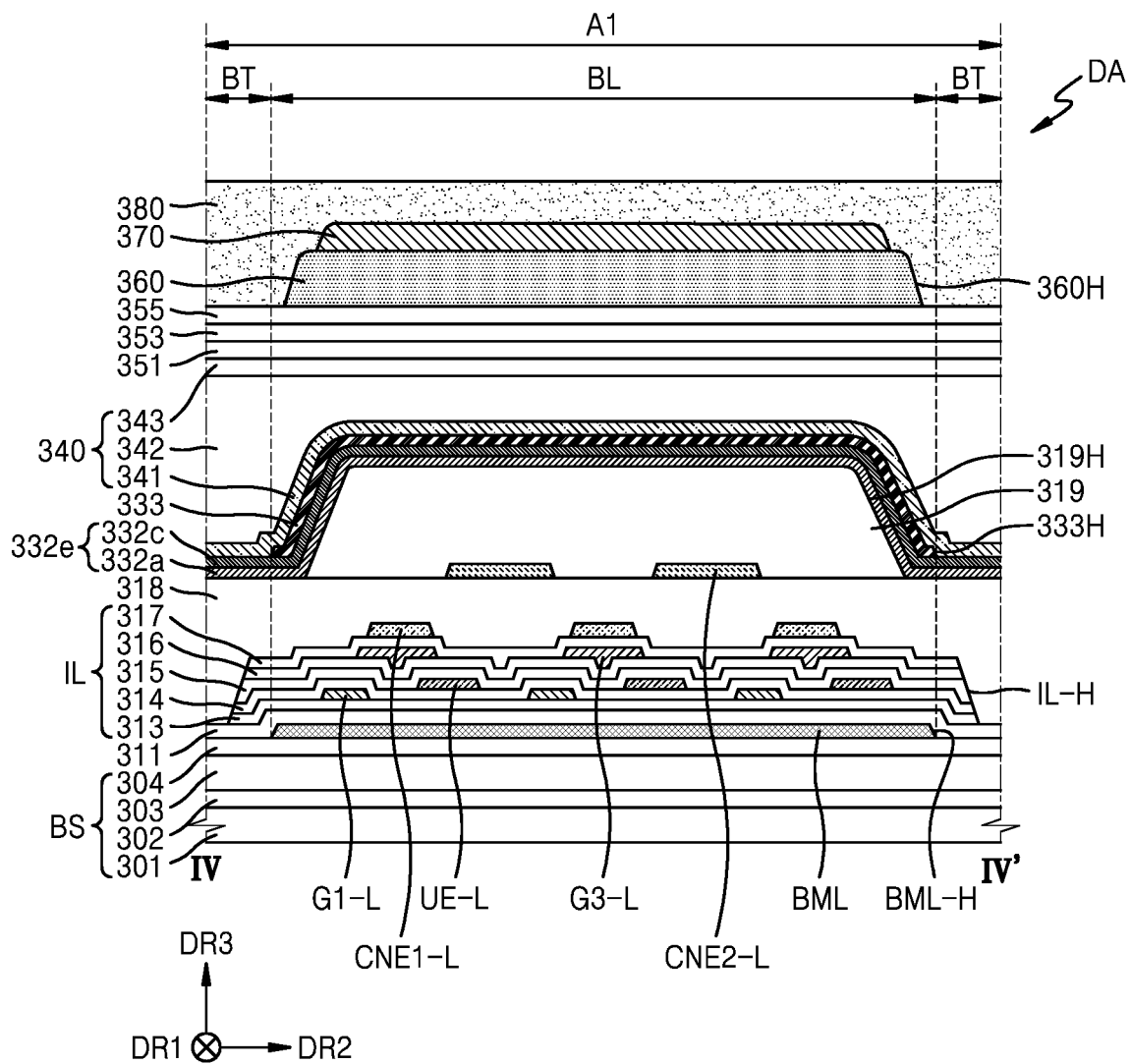
FIG. 12 is a cross-sectional view taken along lines IV-IV' of FIG. 5 illustrating another embodiment of the active area in the electronic device.

FIG. 12 is a cross-sectional view of an active area included in the electronic device 1000 or 2000 according to an embodiment. The embodiment of FIG. 12 is different from the embodiment of FIG. 11 in that a color filter is further arranged on a black matrix. The same reference symbols in FIGS. 11 and 12 denote the same elements, and thus, their descriptions will not be repeated.

Referring to FIG. 12, the color filter 370 may be further arranged on the black matrix 360 in the wire area BL of the first area A1. In an embodiment, the color filter 370 may at least partially overlap the first gate line G1-L, the upper electrode line UE-L, the third gate line G3-L, the first connection electrode line CNE1-L, and the second connection electrode line CNE2-L arranged thereunder. For example, the color filter 370 may completely overlap the first gate line G1-L, the upper electrode line UE-L, the third gate line G3-L, the first connection electrode line CNE1-L, and the second connection electrode line CNE2-L arranged thereunder.

In an embodiment, the color filter 370 may be a red color filter. However, one or more embodiments are not limited thereto. In an embodiment, the color filter 370 may be a green or blue color filter.

In an embodiment, as the color filter 370 is arranged in the wire area BL of the first area A1, a black color may be viewed better on a screen when an electronic device is turned off.

According to the one or more embodiments, although an electronic module overlaps an active area, an electronic device including the electronic module having the improved performance may be implemented. However, the scope of the disclosure is not limited by the effects.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. An electronic device comprising:
a housing comprising a rear surface and side surfaces;
a cover window disposed on an upper portion of the housing;
a display apparatus disposed on a lower portion of the cover window; and
a camera disposed on a lower portion of the display apparatus,
wherein the display apparatus comprises:
a substrate comprising a first area overlapping the camera and a second area adjacent to the first area, wherein the first area comprises a display area, a wire area, and a transmission area;
a first organic insulating layer comprising a valley portion disposed in the display area that is adjacent to the transmission area; and
a pixel-defining layer disposed on the first organic insulating layer and comprising at least a portion filled in the valley portion.

2. The electronic device of claim 1, further comprising:
a second organic insulating layer disposed between the first organic insulating layer and the pixel-defining layer and comprising a first hole defined in the second organic insulating layer and corresponding to the transmission area; and
a third organic insulating layer disposed between the second organic insulating layer and the pixel-defining layer and comprising a second hole defined in the third organic insulating layer and corresponding to the transmission area.

3. The electronic device of claim 2, wherein the pixel-defining layer covers a side surface of the second organic insulating layer, which is adjacent to the transmission area, and a side surface of the third organic insulating layer, which is adjacent to the transmission area.

4. The electronic device of claim 1, wherein the first organic insulating layer is disposed in the first area.

5. The electronic device of claim 1, further comprising:
a light blocking layer disposed in the display apparatus and disposed between the substrate and the first organic insulating layer; and
a protective pattern disposed on the first organic insulating layer in the display area.

6. The electronic device of claim 5, wherein the valley portion is disposed between the protective pattern and an edge portion of the light blocking layer in a plan view.

7. The electronic device of claim 1, wherein the valley portion is disposed along an edge of the transmission area.

8. The electronic device of claim 1, further comprising an inorganic insulating layer disposed between the substrate and the first organic insulating layer,
wherein the valley portion exposes at least a portion of an upper surface of the inorganic insulating layer.

9. The electronic device of claim 1, wherein the valley portion comprises a first valley portion and a second valley portion, and
the pixel-defining layer is filled in at least one of the first valley portion and the second valley portion.

10. The electronic device of claim 1, wherein the pixel-defining layer is disposed in the first area to have an island pattern in a plan view.

11. A display apparatus comprising:
a substrate comprising a first area and a second area adjacent to the first area, wherein the first area comprises a display area, a wire area, and a transmission area;
a first organic insulating layer comprising a valley portion disposed in the display area that is adjacent to the transmission area; and
a pixel-defining layer disposed on the first organic insulating layer and comprising at least a portion filled in the valley portion,
wherein the transmission area has a higher transmittance than the display area.

12. The display apparatus of claim 11, further comprising:
a second organic insulating layer disposed between the first organic insulating layer and the pixel-defining layer and comprising a first hole defined in the second organic insulating layer and corresponding to the transmission area; and a third organic insulating layer disposed between the second organic insulating layer and the pixel-defining layer and comprising a second hole defined in the third organic insulating layer and corresponding to the transmission area.

13. The display apparatus of claim 12, wherein the pixel-defining layer covers a side surface of the second organic insulating layer, which is adjacent to the transmission area, and a side surface of the third organic insulating layer, which is adjacent to the transmission area.

14. The display apparatus of claim 12, wherein the first organic insulating layer is disposed in the first area.

15. The display apparatus of claim 11, further comprising:
a light blocking layer disposed in the display apparatus and disposed between the substrate and the first organic insulating layer; and
a protective pattern disposed on the first organic insulating layer in the display area.

16. The display apparatus of claim 15, wherein the valley portion is disposed between the protective pattern and an edge portion of the light blocking layer in a plan view.

17. The display apparatus of claim 11, wherein the valley portion is disposed along an edge of the transmission area.

18. The display apparatus of claim 11, further comprising an inorganic insulating layer disposed between the substrate and the first organic insulating layer,
wherein the valley portion exposes at least a portion of an upper surface of the inorganic insulating layer.

19. The display apparatus of claim 11, wherein the valley portion comprises a first valley portion and a second valley portion, and
the pixel-defining layer is filled in at least one of the first valley portion and the second valley portion.

20. The display apparatus of claim 11, wherein the pixel-defining layer is disposed in the first area to have an island pattern in a plan view.

* * * * *